(12) United States Patent
Hofstetter et al.

(10) Patent No.: US 12,211,394 B2
(45) Date of Patent: Jan. 28, 2025

(54) SIMULATED TISSUE MODELS AND METHODS

(71) Applicant: Applied Medical Resources Corporation, Rancho Santa Margarita, CA (US)

(72) Inventors: Gregory K. Hofstetter, Lake Forest, CA (US); Tracy Breslin, Trabuco Canyon, CA (US); Nikolai Poulsen, Irvine, CA (US); Khodr Saleh, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 0 days.

(21) Appl. No.: 18/427,587

(22) Filed: Jan. 30, 2024

(65) Prior Publication Data
US 2024/0169861 A1    May 23, 2024

Related U.S. Application Data

(63) Continuation of application No. 17/081,820, filed on Oct. 27, 2020, now Pat. No. 11,887,504, which is a
(Continued)

(51) Int. Cl.
*G09B 23/34*    (2006.01)
*B29C 41/08*    (2006.01)
(Continued)

(52) U.S. Cl.
CPC ............ *G09B 23/34* (2013.01); *B29C 41/085* (2013.01); *B29C 41/20* (2013.01); *B29C 41/22* (2013.01);
(Continued)

(58) Field of Classification Search
None
See application file for complete search history.

(56) References Cited

U.S. PATENT DOCUMENTS

| 184,573 A | 11/1876 | Becker |
|---|---|---|
| 2,127,774 A | 8/1938 | Jacobson |

(Continued)

FOREIGN PATENT DOCUMENTS

| CA | 2 293 585 A1 | 12/1998 |
|---|---|---|
| CN | 2421706 Y | 2/2001 |

(Continued)

OTHER PUBLICATIONS

European Patent Office, Partial Extended European Search Report for European Patent Application No. 23180886.6, titled "Simulated Dissectible Tissue," dated Sep. 20, 2023, 16 pgs.
(Continued)

*Primary Examiner* — James B Hull
(74) *Attorney, Agent, or Firm* — Shirin Bozorgui; Patrick Ikehara

(57) ABSTRACT

Simulated tissue structures for practicing surgical techniques and methods of manufacturing those structures are provided. In particular, a realistic organ model or simulated tissue portion for practicing the removal of a tumor or other undesired tissue followed by suturing a remnant defect as part of the same surgical procedure is provided. The simulated tissue structures include a polyp simulation having a suturable mesh layer that is separable from a defect layer. A simulated colon model with interchangeable and suturable tissue pods is also provided as is a fully suturable rectum model and a rectum model with integrative suturable and removable polyp zones.

20 Claims, 19 Drawing Sheets

Related U.S. Application Data continuation of application No. 15/133,822, filed on Apr. 20, 2016, now Pat. No. 10,818,201, which is a continuation of application No. PCT/US2015/059668, filed on Nov. 9, 2015.

(60) Provisional application No. 62/089,919, filed on Dec. 10, 2014, provisional application No. 62/079,523, filed on Nov. 13, 2014, provisional application No. 62/079,479, filed on Nov. 13, 2014, provisional application No. 62/118,179, filed on Feb. 19, 2015.

(51) Int. Cl.
| | |
|---|---|
| *B29C 41/20* | (2006.01) |
| *B29C 41/22* | (2006.01) |
| *G09B 23/28* | (2006.01) |
| *G09B 23/30* | (2006.01) |
| *B29K 83/00* | (2006.01) |
| *B29L 31/00* | (2006.01) |

(52) U.S. Cl.
CPC ........... *G09B 23/285* (2013.01); *G09B 23/30* (2013.01); *B29K 2083/00* (2013.01); *B29L 2031/753* (2013.01)

(56) References Cited

U.S. PATENT DOCUMENTS

| | | | |
|---|---|---|---|
| 2,284,888 A | 6/1942 | Arneil, Jr. |
| 2,324,702 A | 7/1943 | Hoffman et al. |
| 2,345,489 A | 3/1944 | Lord |
| 2,495,568 A | 1/1950 | Coel |
| 3,766,666 A | 10/1973 | Stroop |
| 3,775,865 A | 12/1973 | Rowan |
| 3,789,518 A | 2/1974 | Chase |
| 3,921,311 A | 11/1975 | Beasley et al. |
| 3,991,490 A | 11/1976 | Markman |
| 4,001,951 A | 1/1977 | Fasse |
| 4,001,952 A | 1/1977 | Kleppinger |
| 4,321,047 A | 3/1982 | Landis |
| 4,323,350 A | 4/1982 | Bowden, Jr. |
| 4,332,569 A | 6/1982 | Burbank |
| 4,371,345 A | 2/1983 | Palmer et al. |
| 4,386,917 A | 6/1983 | Forrest |
| 4,459,113 A | 7/1984 | Boscaro Gatti et al. |
| 4,481,001 A | 11/1984 | Graham et al. |
| 4,596,528 A | 6/1986 | Lewis et al. |
| 4,726,772 A | 2/1988 | Amplatz |
| 4,737,109 A | 4/1988 | Abramson |
| 4,789,340 A | 12/1988 | Zikria |
| 4,832,978 A | 5/1989 | Lesser |
| 4,867,686 A | 9/1989 | Goldstein |
| 4,907,973 A | 3/1990 | Hon |
| 4,938,696 A | 7/1990 | Foster et al. |
| 4,940,412 A | 7/1990 | Blumenthal |
| 5,061,187 A | 10/1991 | Jerath |
| 5,083,962 A | 1/1992 | Pracas |
| 5,104,328 A | 4/1992 | Lounsbury |
| 5,149,270 A | 9/1992 | McKeown |
| 5,180,308 A | 1/1993 | Garito et al. |
| 5,230,630 A | 7/1993 | Burgett |
| 5,273,435 A | 12/1993 | Jacobson |
| 5,295,694 A | 3/1994 | Levin |
| 5,310,348 A | 5/1994 | Miller |
| 5,318,448 A | 6/1994 | Garito et al. |
| 5,320,537 A | 6/1994 | Watson |
| 5,358,408 A | 10/1994 | Medina |
| 5,368,487 A | 11/1994 | Medina |
| 5,380,207 A | 1/1995 | Siepser |
| 5,403,191 A | 4/1995 | Tuason |
| 5,425,644 A | 6/1995 | Szinicz |
| 5,425,731 A | 6/1995 | Daniel et al. |
| 5,472,345 A | 12/1995 | Eggert |
| 5,518,406 A | 5/1996 | Waters |
| 5,518,407 A | 5/1996 | Greenfield et al. |
| 5,520,633 A | 5/1996 | Costin |
| 5,541,304 A | 7/1996 | Thompson |
| 5,620,326 A | 4/1997 | Younker |
| 5,720,742 A | 2/1998 | Zacharias |
| 5,722,836 A | 3/1998 | Younker |
| 5,727,948 A | 3/1998 | Jordan |
| 5,743,730 A | 4/1998 | Clester et al. |
| 5,762,458 A | 6/1998 | Wang et al. |
| 5,769,640 A | 6/1998 | Jacobus et al. |
| 5,775,916 A | 7/1998 | Cooper et al. |
| 5,785,531 A | 7/1998 | Leung |
| 5,800,178 A | 9/1998 | Gillio |
| 5,803,746 A | 9/1998 | Barrie et al. |
| 5,807,378 A | 9/1998 | Jensen et al. |
| 5,810,880 A | 9/1998 | Jensen et al. |
| 5,814,038 A | 9/1998 | Jensen et al. |
| 5,850,033 A | 12/1998 | Mirzeabasov et al. |
| 5,855,583 A | 1/1999 | Wang et al. |
| 5,873,732 A | 2/1999 | Hasson |
| 5,873,863 A | 2/1999 | Komlosi |
| 5,908,302 A | 6/1999 | Goldfarb |
| 5,947,743 A | 9/1999 | Hasson |
| 5,951,301 A | 9/1999 | Younker |
| 6,080,181 A | 6/2000 | Jensen et al. |
| 6,083,008 A | 7/2000 | Yamada et al. |
| 6,113,395 A | 9/2000 | Hon |
| 6,234,804 B1 | 5/2001 | Yong |
| 6,271,278 B1 | 8/2001 | Park et al. |
| 6,336,812 B1 | 1/2002 | Cooper et al. |
| 6,398,557 B1 | 6/2002 | Hoballah |
| 6,413,264 B1 | 7/2002 | Jensen et al. |
| 6,474,993 B1 | 11/2002 | Grund et al. |
| 6,485,308 B1 | 11/2002 | Goldstein |
| 6,488,507 B1 | 12/2002 | Stoloff et al. |
| 6,497,902 B1 | 12/2002 | Ma |
| 6,511,325 B1 | 1/2003 | Lalka et al. |
| 6,517,354 B1 | 2/2003 | Levy |
| 6,568,941 B1 | 5/2003 | Goldstein |
| 6,589,057 B1 | 7/2003 | Keenan et al. |
| 6,620,174 B2 | 9/2003 | Jensen et al. |
| 6,654,000 B2 | 11/2003 | Rosenberg |
| 6,659,776 B1 | 12/2003 | Aumann et al. |
| 6,773,263 B2 | 8/2004 | Nicholls et al. |
| 6,780,016 B1 | 8/2004 | Toly |
| 6,817,973 B2 | 11/2004 | Merril et al. |
| 6,820,025 B2 | 11/2004 | Bachmann et al. |
| 6,854,976 B1 | 2/2005 | Suhr |
| 6,857,878 B1 | 2/2005 | Chosack et al. |
| 6,863,536 B1 | 3/2005 | Fisher et al. |
| 6,866,514 B2 | 3/2005 | Von Roeschlaub et al. |
| 6,887,082 B2 | 5/2005 | Shun |
| 6,929,481 B1 | 8/2005 | Alexander et al. |
| 6,939,138 B2 | 9/2005 | Chosack et al. |
| 6,950,025 B1 | 9/2005 | Nguyen |
| 6,960,617 B2 | 11/2005 | Omidian et al. |
| 6,997,719 B2 | 2/2006 | Wellman et al. |
| 7,008,232 B2 | 3/2006 | Brassel |
| 7,018,327 B1 | 3/2006 | Conti |
| 7,025,064 B2 | 4/2006 | Wang et al. |
| 7,056,123 B2 | 6/2006 | Gregorio et al. |
| 7,080,984 B1 | 7/2006 | Cohen |
| 7,118,582 B1 | 10/2006 | Wang et al. |
| 7,255,565 B2 | 8/2007 | Keegan |
| 7,269,532 B2 | 9/2007 | David et al. |
| 7,272,766 B2 | 9/2007 | Sakezles |
| 7,300,450 B2 | 11/2007 | Vleugels et al. |
| 7,364,582 B2 | 4/2008 | Lee |
| 7,404,716 B2 | 7/2008 | Gregorio et al. |
| 7,419,376 B2 | 9/2008 | Sarvazyan et al. |
| 7,427,199 B2 | 9/2008 | Sakezles |
| 7,431,189 B2 | 10/2008 | Shelton, IV et al. |
| 7,441,684 B2 | 10/2008 | Shelton, IV et al. |
| 7,465,168 B2 | 12/2008 | Allen et al. |
| 7,467,075 B2 | 12/2008 | Humphries et al. |
| 7,544,062 B1 | 6/2009 | Hauschild et al. |
| 7,549,866 B2 | 6/2009 | Cohen et al. |
| 7,553,159 B1 | 6/2009 | Arnal et al. |
| 7,575,434 B2 | 8/2009 | Palakodeti |

(56) References Cited

U.S. PATENT DOCUMENTS

| | | |
|---|---|---|
| 7,594,815 B2 | 9/2009 | Toly |
| 7,621,749 B2 | 11/2009 | Munday |
| 7,646,901 B2 | 1/2010 | Murphy et al. |
| 7,648,367 B1 | 1/2010 | Makower et al. |
| 7,648,513 B2 | 1/2010 | Green et al. |
| 7,651,332 B2 | 1/2010 | Dupuis et al. |
| 7,677,897 B2 | 3/2010 | Sakezles |
| 7,775,916 B1 | 8/2010 | Mahoney |
| 7,780,451 B2 | 8/2010 | Willobee et al. |
| 7,802,990 B2 | 9/2010 | Korndorffer et al. |
| 7,803,151 B2 | 9/2010 | Whitman |
| 7,806,696 B2 | 10/2010 | Alexander et al. |
| 7,819,799 B2 | 10/2010 | Merril et al. |
| 7,833,018 B2 | 11/2010 | Alexander et al. |
| 7,837,473 B2 | 11/2010 | Koh |
| 7,850,454 B2 | 12/2010 | Toly |
| 7,850,456 B2 | 12/2010 | Chosack et al. |
| 7,854,612 B2 | 12/2010 | Frassica et al. |
| 7,857,626 B2 | 12/2010 | Toly |
| 7,866,983 B2 | 1/2011 | Hemphill et al. |
| 7,931,470 B2 | 4/2011 | Alexander et al. |
| 7,931,471 B2 | 4/2011 | Senagore et al. |
| 7,988,992 B2 | 8/2011 | Omidian et al. |
| 7,993,140 B2 | 8/2011 | Sakezles |
| 7,997,903 B2 | 8/2011 | Hasson et al. |
| 8,007,281 B2 | 8/2011 | Toly |
| 8,007,282 B2 | 8/2011 | Gregorio et al. |
| 8,016,818 B2 | 9/2011 | Ellis et al. |
| 8,017,107 B2 | 9/2011 | Thomas et al. |
| 8,021,162 B2 | 9/2011 | Sui |
| 8,048,088 B2 | 11/2011 | Green et al. |
| 8,083,691 B2 | 12/2011 | Goldenberg et al. |
| 8,116,847 B2 | 2/2012 | Gattani et al. |
| 8,137,110 B2 | 3/2012 | Sakezles |
| 8,157,145 B2 | 4/2012 | Shelton, IV et al. |
| 8,197,464 B2 | 6/2012 | Krever et al. |
| 8,205,779 B2 | 6/2012 | Ma et al. |
| 8,221,129 B2 | 7/2012 | Parry et al. |
| 8,297,982 B2 | 10/2012 | Park et al. |
| 8,308,817 B2 | 11/2012 | Egilsson et al. |
| 8,323,028 B2 | 12/2012 | Matanhelia |
| 8,323,029 B2 | 12/2012 | Toly |
| 8,328,560 B2 | 12/2012 | Niblock et al. |
| 8,342,851 B1 | 1/2013 | Speeg et al. |
| 8,403,674 B2 | 3/2013 | Feygin et al. |
| 8,403,675 B2 | 3/2013 | Stoianovici et al. |
| 8,403,676 B2 | 3/2013 | Frassica et al. |
| 8,408,920 B2 | 4/2013 | Speller |
| 8,425,234 B2 | 4/2013 | Sakezles |
| 8,439,687 B1 | 5/2013 | Morriss et al. |
| 8,442,621 B2 | 5/2013 | Gorek et al. |
| 8,454,368 B2 | 6/2013 | Ault et al. |
| 8,459,094 B2 | 6/2013 | Yanni |
| 8,459,520 B2 | 6/2013 | Giordano et al. |
| 8,460,002 B2 | 6/2013 | Wang et al. |
| 8,465,771 B2 | 6/2013 | Wan et al. |
| 8,469,715 B2 | 6/2013 | Ambrozio |
| 8,469,716 B2 | 6/2013 | Fedotov et al. |
| 8,480,407 B2 | 7/2013 | Campbell et al. |
| 8,480,408 B2 | 7/2013 | Ishii et al. |
| 8,491,309 B2 | 7/2013 | Parry et al. |
| 8,500,753 B2 | 8/2013 | Green et al. |
| 8,512,044 B2 | 8/2013 | Sakezles |
| 8,517,243 B2 | 8/2013 | Giordano et al. |
| 8,521,252 B2 | 8/2013 | Diez |
| 8,535,062 B2 | 9/2013 | Nguyen |
| 8,544,711 B2 | 10/2013 | Ma et al. |
| 8,556,635 B2 | 10/2013 | Toly |
| 8,608,483 B2 | 12/2013 | Trotta et al. |
| 8,613,621 B2 | 12/2013 | Henderickson et al. |
| 8,636,520 B2 | 1/2014 | Iwasaki et al. |
| D699,297 S | 2/2014 | Bahsooun et al. |
| 8,641,423 B2 | 2/2014 | Gumkowski |
| 8,647,125 B2 | 2/2014 | Johns et al. |
| 8,678,831 B2 | 3/2014 | Trotta et al. |
| 8,679,279 B2 | 3/2014 | Thompson et al. |
| 8,696,363 B2 | 4/2014 | Gray et al. |
| 8,708,213 B2 | 4/2014 | Shelton, IV et al. |
| 8,708,707 B2 | 4/2014 | Hendrickson et al. |
| 8,764,449 B2 | 7/2014 | Rios et al. |
| 8,764,452 B2 | 7/2014 | Pravong et al. |
| 8,800,839 B2 | 8/2014 | Beetel |
| 8,801,437 B2 | 8/2014 | Mousques |
| 8,801,438 B2 | 8/2014 | Sakezles |
| 8,807,414 B2 | 8/2014 | Ross et al. |
| 8,808,004 B2 | 8/2014 | Misawa et al. |
| 8,808,311 B2 | 8/2014 | Heinrich et al. |
| 8,814,573 B2 | 8/2014 | Nguyen |
| 8,827,988 B2 | 9/2014 | Belson et al. |
| 8,840,628 B2 | 9/2014 | Green et al. |
| 8,870,576 B2 | 10/2014 | Millon et al. |
| 8,888,498 B2 | 11/2014 | Bisaillon et al. |
| 8,893,946 B2 | 11/2014 | Boudreaux et al. |
| 8,911,238 B2 | 12/2014 | Forsythe |
| 8,915,742 B2 | 12/2014 | Hendrickson et al. |
| 8,945,095 B2 | 2/2015 | Blumenkranz et al. |
| 8,961,190 B2 | 2/2015 | Hart et al. |
| 8,966,954 B2 | 3/2015 | Ni et al. |
| 8,968,003 B2 | 3/2015 | Hendrickson et al. |
| 9,008,989 B2 | 4/2015 | Wilson et al. |
| 9,017,080 B1 | 4/2015 | Placik |
| 9,026,247 B2 | 5/2015 | White |
| 9,050,201 B2 | 6/2015 | Egilsson et al. |
| 9,056,126 B2 | 6/2015 | Hersel et al. |
| 9,070,306 B2 | 6/2015 | Rappel et al. |
| 9,087,458 B2 | 7/2015 | Shim et al. |
| 9,096,744 B2 | 8/2015 | Wan et al. |
| 9,117,377 B2 | 8/2015 | Shim et al. |
| 9,119,572 B2 | 9/2015 | Gorek et al. |
| 9,123,261 B2 | 9/2015 | Lowe |
| 9,129,054 B2 | 9/2015 | Nawana et al. |
| 9,196,176 B2 | 11/2015 | Hager et al. |
| 9,226,799 B2 | 1/2016 | Lightcap et al. |
| 9,257,055 B2 | 2/2016 | Endo et al. |
| 9,265,587 B2 | 2/2016 | Vancamberg et al. |
| 9,295,468 B2 | 3/2016 | Heinrich et al. |
| 9,351,714 B2 | 5/2016 | Ross et al. |
| 9,336,694 B2 | 6/2016 | Shim et al. |
| 9,358,682 B2 | 6/2016 | Ruiz Morales |
| 9,364,224 B2 | 6/2016 | Nicholas et al. |
| 9,364,279 B2 | 6/2016 | Houser et al. |
| 9,370,361 B2 | 6/2016 | Viola et al. |
| 9,373,270 B2 | 6/2016 | Miyazaki |
| 9,387,276 B2 | 7/2016 | Sun et al. |
| 9,427,496 B2 | 8/2016 | Sun et al. |
| 9,439,649 B2 | 9/2016 | Shelton, IV et al. |
| 9,439,733 B2 | 9/2016 | Ha et al. |
| 9,449,532 B2 | 9/2016 | Black et al. |
| 9,468,438 B2 | 10/2016 | Baber et al. |
| 2001/0019818 A1 | 9/2001 | Yong |
| 2002/0168619 A1 | 11/2002 | Provenza |
| 2003/0031993 A1 | 2/2003 | Pugh |
| 2003/0091967 A1 | 5/2003 | Chosack et al. |
| 2003/0176770 A1 | 9/2003 | Merril et al. |
| 2004/0005423 A1 | 1/2004 | Dalton et al. |
| 2004/0126746 A1 | 7/2004 | Toly |
| 2004/0248072 A1 | 12/2004 | Gray et al. |
| 2005/0008997 A1 | 1/2005 | Herman |
| 2005/0026125 A1 | 2/2005 | Toly |
| 2005/0064378 A1 | 3/2005 | Toly |
| 2005/0084833 A1 | 4/2005 | Lacey et al. |
| 2005/0131390 A1 | 6/2005 | Heinrich et al. |
| 2005/0142525 A1 | 6/2005 | Cotin et al. |
| 2005/0192595 A1 | 9/2005 | Green et al. |
| 2005/0196739 A1 | 9/2005 | Moriyama |
| 2005/0196740 A1 | 9/2005 | Moriyama |
| 2005/0214727 A1 | 9/2005 | Stoianovici et al. |
| 2006/0046235 A1 | 3/2006 | Alexander et al. |
| 2006/0232664 A1 | 10/2006 | Toly |
| 2006/0252019 A1 | 11/2006 | Burkitt et al. |
| 2006/0275741 A1 | 12/2006 | Chewning et al. |
| 2007/0074584 A1 | 4/2007 | Talarico et al. |
| 2007/0077544 A1 | 4/2007 | Lemperle et al. |
| 2007/0078484 A1 | 4/2007 | Talarico et al. |

(56) References Cited

U.S. PATENT DOCUMENTS

| | | |
|---|---|---|
| 2007/0148626 A1 | 6/2007 | Ikeda |
| 2007/0166682 A1 | 7/2007 | Yarin et al. |
| 2007/0197895 A1 | 8/2007 | Nycz et al. |
| 2007/0225734 A1 | 9/2007 | Bell et al. |
| 2007/0238081 A1 | 10/2007 | Koh |
| 2007/0275359 A1 | 11/2007 | Rotnes et al. |
| 2008/0032272 A1 | 2/2008 | Palakodeti |
| 2008/0032273 A1 | 2/2008 | Macnamara et al. |
| 2008/0052034 A1 | 2/2008 | David et al. |
| 2008/0064017 A1 | 3/2008 | Grundmeyer, III |
| 2008/0076101 A1 | 3/2008 | Hyde et al. |
| 2008/0097501 A1 | 4/2008 | Blier |
| 2008/0108869 A1 | 5/2008 | Sanders et al. |
| 2008/0187895 A1 | 8/2008 | Sakezles |
| 2008/0188948 A1 | 8/2008 | Flatt |
| 2008/0299529 A1 | 12/2008 | Schaller |
| 2008/0317818 A1 | 12/2008 | Griffith et al. |
| 2009/0068627 A1 | 3/2009 | Toly |
| 2009/0142739 A1 | 6/2009 | Wang et al. |
| 2009/0142741 A1 | 6/2009 | Ault et al. |
| 2009/0143642 A1 | 6/2009 | Takahashi et al. |
| 2009/0176196 A1 | 7/2009 | Niblock et al. |
| 2009/0187079 A1 | 7/2009 | Albrecht et al. |
| 2009/0246747 A1 | 10/2009 | Buckman, Jr. |
| 2009/0298034 A1 | 12/2009 | Parry et al. |
| 2009/0314550 A1 | 12/2009 | Layton |
| 2010/0047752 A1 | 2/2010 | Chan et al. |
| 2010/0094312 A1 | 4/2010 | Ruiz Morales et al. |
| 2010/0099067 A1 | 4/2010 | Agro |
| 2010/0167248 A1 | 7/2010 | Ryan |
| 2010/0167249 A1 | 7/2010 | Ryan |
| 2010/0167250 A1 | 7/2010 | Ryan et al. |
| 2010/0167253 A1 | 7/2010 | Ryan et al. |
| 2010/0167254 A1 | 7/2010 | Nguyen |
| 2010/0094730 A1 | 8/2010 | Di Betta et al. |
| 2010/0196867 A1 | 8/2010 | Geerligs et al. |
| 2010/0204713 A1 | 8/2010 | Ruiz Morales |
| 2010/0209899 A1 | 8/2010 | Park |
| 2010/0248200 A1 | 9/2010 | Ladak |
| 2010/0258611 A1 | 10/2010 | Smith et al. |
| 2010/0273136 A1 | 10/2010 | Kandasami et al. |
| 2010/0279263 A1 | 11/2010 | Duryea |
| 2010/0285094 A1 | 11/2010 | Gupta |
| 2010/0324541 A1 | 12/2010 | Whitman |
| 2011/0020779 A1 | 1/2011 | Hannaford et al. |
| 2011/0046637 A1 | 2/2011 | Patel et al. |
| 2011/0046659 A1 | 2/2011 | Ramstein et al. |
| 2011/0087238 A1 | 4/2011 | Wang et al. |
| 2011/0091855 A1 | 4/2011 | Miyazaki |
| 2011/0137337 A1 | 6/2011 | van den Dool et al. |
| 2011/0200976 A1 | 8/2011 | Hou et al. |
| 2011/0207104 A1 | 8/2011 | Trotta |
| 2011/0218550 A1 | 9/2011 | Ma |
| 2011/0244436 A1 | 10/2011 | Campo |
| 2011/0269109 A2 | 11/2011 | Miyazaki |
| 2011/0281251 A1 | 11/2011 | Mousques |
| 2011/0301620 A1 | 12/2011 | Di Betta et al. |
| 2012/0015337 A1 | 1/2012 | Hendrickson et al. |
| 2012/0015339 A1* | 1/2012 | Hendrickson ......... G09B 23/30 434/273 |
| 2012/0016362 A1 | 1/2012 | Heinrich et al. |
| 2012/0028231 A1 | 2/2012 | Misawa et al. |
| 2012/0034587 A1 | 2/2012 | Toly |
| 2012/0045743 A1 | 2/2012 | Misawa et al. |
| 2012/0065632 A1 | 3/2012 | Shadduck |
| 2012/0082970 A1 | 4/2012 | Pravong et al. |
| 2012/0100217 A1 | 4/2012 | Green et al. |
| 2012/0115117 A1 | 5/2012 | Marshall |
| 2012/0115118 A1 | 5/2012 | Marshall |
| 2012/0116391 A1 | 5/2012 | Houser et al. |
| 2012/0148994 A1 | 6/2012 | Hori et al. |
| 2012/0164616 A1 | 6/2012 | Endo et al. |
| 2012/0165866 A1 | 6/2012 | Kaiser et al. |
| 2012/0172873 A1 | 7/2012 | Artale et al. |
| 2012/0179072 A1 | 7/2012 | Kegreiss |
| 2012/0202180 A1 | 8/2012 | Stock et al. |
| 2012/0264096 A1 | 10/2012 | Taylor et al. |
| 2012/0264097 A1 | 10/2012 | Newcott et al. |
| 2012/0282583 A1 | 11/2012 | Thaler et al. |
| 2012/0282584 A1 | 11/2012 | Millon et al. |
| 2012/0283707 A1 | 11/2012 | Giordano et al. |
| 2012/0288839 A1 | 11/2012 | Crabtree |
| 2012/0308977 A1 | 12/2012 | Tortola |
| 2013/0087597 A1 | 4/2013 | Shelton, IV et al. |
| 2013/0101973 A1 | 4/2013 | Hoke et al. |
| 2013/0105552 A1 | 5/2013 | Weir et al. |
| 2013/0116668 A1 | 5/2013 | Shelton, IV et al. |
| 2013/0157240 A1 | 6/2013 | Hart et al. |
| 2013/0171288 A1 | 7/2013 | Harders |
| 2013/0177890 A1 | 7/2013 | Sakezles |
| 2013/0192741 A1 | 8/2013 | Trotta et al. |
| 2013/0218166 A1 | 8/2013 | Elmore |
| 2013/0224709 A1 | 8/2013 | Riojas et al. |
| 2013/0245681 A1 | 9/2013 | Straehnz et al. |
| 2013/0253480 A1 | 9/2013 | Kimball et al. |
| 2013/0267876 A1 | 10/2013 | Leckenby et al. |
| 2013/0282038 A1 | 10/2013 | Dannaher et al. |
| 2013/0288216 A1 | 10/2013 | Parry, Jr. et al. |
| 2013/0302771 A1 | 11/2013 | Alderete |
| 2013/0324991 A1 | 12/2013 | Clem et al. |
| 2013/0324999 A1 | 12/2013 | Price et al. |
| 2014/0011172 A1 | 1/2014 | Lowe |
| 2014/0017651 A1 | 1/2014 | Sugimoto et al. |
| 2014/0030682 A1 | 1/2014 | Thilenius |
| 2014/0038151 A1 | 2/2014 | Hart |
| 2014/0051049 A1 | 2/2014 | Jarc et al. |
| 2014/0072941 A1 | 3/2014 | Hendrickson et al. |
| 2014/0087345 A1 | 3/2014 | Breslin et al. |
| 2014/0087346 A1 | 3/2014 | Breslin et al. |
| 2014/0087347 A1 | 3/2014 | Tracy et al. |
| 2014/0087348 A1 | 3/2014 | Tracy et al. |
| 2014/0088413 A1 | 3/2014 | Von Bucsh et al. |
| 2014/0093852 A1 | 4/2014 | Poulsen et al. |
| 2014/0093854 A1 | 4/2014 | Poulsen et al. |
| 2014/0099858 A1 | 4/2014 | Hernandez |
| 2014/0106328 A1 | 4/2014 | Loor |
| 2014/0107471 A1 | 4/2014 | Haider et al. |
| 2014/0156002 A1 | 6/2014 | Thompson et al. |
| 2014/0162016 A1 | 6/2014 | Matsui et al. |
| 2014/0170623 A1 | 6/2014 | Jarstad et al. |
| 2014/0186809 A1 | 7/2014 | Hendrickson et al. |
| 2014/0187855 A1 | 7/2014 | Nagale et al. |
| 2014/0200561 A1 | 7/2014 | Ingmanson et al. |
| 2014/0212861 A1 | 7/2014 | Romano |
| 2014/0220527 A1 | 8/2014 | Li et al. |
| 2014/0220530 A1 | 8/2014 | Merkle et al. |
| 2014/0220532 A1 | 8/2014 | Ghez et al. |
| 2014/0242564 A1 | 8/2014 | Pravong et al. |
| 2014/0246479 A1 | 9/2014 | Baber et al. |
| 2014/0248596 A1 | 9/2014 | Hart et al. |
| 2014/0263538 A1 | 9/2014 | Leimbach et al. |
| 2014/0272878 A1 | 9/2014 | Shim et al. |
| 2014/0272879 A1 | 9/2014 | Shim et al. |
| 2014/0275795 A1 | 9/2014 | Little et al. |
| 2014/0275981 A1 | 9/2014 | Selover et al. |
| 2014/0277017 A1 | 9/2014 | Leimbach et al. |
| 2014/0303643 A1 | 10/2014 | Ha et al. |
| 2014/0303646 A1 | 10/2014 | Morgan et al. |
| 2014/0303660 A1 | 10/2014 | Boyden et al. |
| 2014/0308643 A1 | 10/2014 | Trotta et al. |
| 2014/0342334 A1 | 11/2014 | Black et al. |
| 2014/0349266 A1 | 11/2014 | Choi |
| 2014/0350530 A1 | 11/2014 | Ross et al. |
| 2014/0357977 A1 | 12/2014 | Zhou |
| 2014/0370477 A1 | 12/2014 | Black et al. |
| 2014/0371761 A1 | 12/2014 | Juanpera |
| 2014/0378995 A1 | 12/2014 | Kumar et al. |
| 2015/0031008 A1 | 1/2015 | Black et al. |
| 2015/0037773 A1 | 2/2015 | Quirarte Catano |
| 2015/0038613 A1 | 2/2015 | Sun et al. |
| 2015/0076207 A1 | 3/2015 | Boudreaux et al. |
| 2015/0086955 A1 | 3/2015 | Poniatowski et al. |
| 2015/0132732 A1 | 5/2015 | Hart et al. |
| 2015/0132733 A1 | 5/2015 | Garvik et al. |

(56) References Cited

U.S. PATENT DOCUMENTS

| | | | |
|---|---|---|---|
| 2015/0135832 | A1 | 5/2015 | Blumenkranz et al. |
| 2015/0148660 | A1 | 5/2015 | Weiss et al. |
| 2015/0164598 | A1 | 6/2015 | Blumenkranz et al. |
| 2015/0187229 | A1 | 7/2015 | Wachli et al. |
| 2015/0194075 | A1 | 7/2015 | Rappel et al. |
| 2015/0202299 | A1 | 7/2015 | Burdick et al. |
| 2015/0209035 | A1 | 7/2015 | Zemlock |
| 2015/0209059 | A1 | 7/2015 | Trees et al. |
| 2015/0209573 | A1 | 7/2015 | Hibner et al. |
| 2015/0228206 | A1 | 8/2015 | Shim et al. |
| 2015/0262511 | A1 | 9/2015 | Lin et al. |
| 2015/0265431 | A1 | 9/2015 | Egilsson et al. |
| 2015/0272571 | A1 | 10/2015 | Leimbach et al. |
| 2015/0272574 | A1 | 10/2015 | Leimbach et al. |
| 2015/0272580 | A1 | 10/2015 | Leimbach et al. |
| 2015/0272581 | A1 | 10/2015 | Leimbach et al. |
| 2015/0272583 | A1 | 10/2015 | Leimbach et al. |
| 2015/0272604 | A1 | 10/2015 | Chowaniec et al. |
| 2015/0332609 | A1 | 11/2015 | Alexander |
| 2015/0358426 | A1 | 12/2015 | Kimball et al. |
| 2015/0371560 | A1 | 12/2015 | Lowe |
| 2015/0374378 | A1 | 12/2015 | Giordano et al. |
| 2015/0374449 | A1 | 12/2015 | Chowaniec et al. |
| 2016/0000437 | A1 | 1/2016 | Giordano et al. |
| 2016/0022374 | A1 | 1/2016 | Haider et al. |
| 2016/0030240 | A1 | 2/2016 | Gonenc et al. |
| 2016/0031091 | A1 | 2/2016 | Popovic et al. |
| 2016/0058534 | A1 | 3/2016 | Derwin et al. |
| 2016/0066909 | A1 | 3/2016 | Baber et al. |
| 2016/0070436 | A1 | 3/2016 | Thomas et al. |
| 2016/0073928 | A1 | 3/2016 | Soper et al. |
| 2016/0074103 | A1 | 3/2016 | Sartor |
| 2016/0098933 | A1 | 4/2016 | Reiley et al. |
| 2016/0104394 | A1 | 4/2016 | Miyazaki |
| 2016/0117956 | A1 | 4/2016 | Larsson et al. |
| 2016/0125762 | A1 | 5/2016 | Becker et al. |
| 2016/0133158 | A1 | 5/2016 | Sui et al. |
| 2016/0140876 | A1 | 5/2016 | Jabbour et al. |
| 2016/0194378 | A1 | 7/2016 | Cass et al. |
| 2016/0199059 | A1 | 7/2016 | Shelton, IV et al. |
| 2016/0220150 | A1 | 8/2016 | Sharonov |
| 2016/0220314 | A1 | 8/2016 | Huelman et al. |
| 2016/0225288 | A1 | 8/2016 | East et al. |
| 2016/0232819 | A1 | 8/2016 | Hofstetter et al. |
| 2016/0235494 | A1 | 8/2016 | Shelton, IV et al. |
| 2016/0256187 | A1 | 9/2016 | Shelton, IV et al. |
| 2016/0256229 | A1 | 9/2016 | Morgan et al. |
| 2016/0262736 | A1 | 9/2016 | Ross et al. |
| 2016/0262745 | A1 | 9/2016 | Morgan et al. |
| 2016/0293055 | A1 | 10/2016 | Hofstetter |
| 2016/0296144 | A1 | 10/2016 | Gaddam et al. |

FOREIGN PATENT DOCUMENTS

| | | | |
|---|---|---|---|
| CN | 2751372 | Y | 1/2006 |
| CN | 2909427 | Y | 6/2007 |
| CN | 101313842 | A | 12/2008 |
| CN | 101528780 | A | 9/2009 |
| CN | 201364679 | Y | 12/2009 |
| CN | 201955979 | U | 8/2011 |
| CN | 102458496 | A | 5/2012 |
| CN | 202443680 | U | 9/2012 |
| CN | 202563792 | U | 11/2012 |
| CN | 202601055 | U | 12/2012 |
| CN | 202694651 | U | 1/2013 |
| CN | 103050040 | A | 4/2013 |
| CN | 203013103 | U | 6/2013 |
| CN | 203038549 | U | 7/2013 |
| CN | 203338651 | U | 12/2013 |
| CN | 203397593 | U | 1/2014 |
| CN | 203562128 | U | 4/2014 |
| CN | 102596275 | B | 6/2014 |
| CN | 103845757 | A | 6/2014 |
| CN | 103886797 | A | 6/2014 |
| CN | 103396562 | B | 7/2015 |
| CN | 105194740 | A | 12/2015 |
| CN | 105504166 | A | 4/2016 |
| DE | 9102218 | U1 | 5/1991 |
| DE | 41 05 892 | A1 | 8/1992 |
| DE | 93 20 422 | U1 | 6/1994 |
| DE | 44 14 832 | A1 | 11/1995 |
| DE | 19716341 | A1 | 9/2000 |
| EP | 1 024 173 | A1 | 8/2000 |
| EP | 0 990 227 | B1 | 4/2002 |
| EP | 1 609 431 | A1 | 12/2005 |
| EP | 0 870 292 | B1 | 7/2008 |
| EP | 2 068 295 | A2 | 6/2009 |
| EP | 2 218 570 | A1 | 8/2010 |
| FR | 2 691 826 | A1 | 12/1993 |
| FR | 2 917 876 | A1 | 12/2008 |
| GB | 2488994 | A | 9/2012 |
| JP | 10 211160 | | 8/1998 |
| JP | 2001005378 | A | 1/2001 |
| JP | 2006187566 | A | 7/2006 |
| JP | 2009063787 | A | 3/2009 |
| JP | 2009236963 | A | 10/2009 |
| JP | 3162161 | U | 8/2010 |
| JP | 2011113056 | A | 6/2011 |
| JP | 2013127496 | A | 6/2013 |
| KR | 101231565 | B1 | 2/2013 |
| MX | PA 02004422 | A | 11/2003 |
| PT | 106230 | | 9/2013 |
| WO | WO 1994/06109 | A1 | 3/1994 |
| WO | WO 1996/042076 | A1 | 12/1996 |
| WO | WO 1998/58358 | A1 | 12/1998 |
| WO | WO 1999/01074 | A1 | 1/1999 |
| WO | WO 2000/36577 | A1 | 6/2000 |
| WO | WO 2002/38039 | A2 | 5/2002 |
| WO | WO 2002/038039 | A3 | 5/2002 |
| WO | WO 2004/032095 | A1 | 4/2004 |
| WO | WO 2004/082486 | A1 | 9/2004 |
| WO | WO 2005/071639 | A1 | 8/2005 |
| WO | WO 2005/083653 | A1 | 9/2005 |
| WO | WO 2006/083963 | A2 | 8/2006 |
| WO | WO 2007/068360 | A1 | 6/2007 |
| WO | WO 2008/021720 | A2 | 2/2008 |
| WO | WO 2008/103383 | A1 | 8/2008 |
| WO | WO 2009/000939 | A1 | 12/2008 |
| WO | WO 2009/089614 | A1 | 7/2009 |
| WO | WO 2010/094730 | A1 | 8/2010 |
| WO | WO 2011/035410 | A1 | 3/2011 |
| WO | WO 2011/046606 | A1 | 4/2011 |
| WO | WO 2011/127379 | A2 | 10/2011 |
| WO | WO 2011/151304 | A1 | 12/2011 |
| WO | WO 2012/149606 | A1 | 11/2012 |
| WO | WO 2012/168287 | A1 | 12/2012 |
| WO | WO 2012/175993 | A1 | 12/2012 |
| WO | WO 2013/048978 | A1 | 4/2013 |
| WO | WO 2013/103956 | A1 | 7/2013 |
| WO | WO 2014/022815 | A1 | 2/2014 |
| WO | WO 2014/093669 | A1 | 6/2014 |
| WO | WO 2014/197793 | A1 | 12/2014 |
| WO | WO 2015/148817 | A1 | 10/2015 |
| WO | WO 2016/138528 | A1 | 9/2016 |
| WO | WO 2016/183412 | A1 | 11/2016 |
| WO | WO 2016/198238 | A1 | 12/2016 |
| WO | WO 2016/201085 | A1 | 12/2016 |
| WO | WO 2017/031214 | A1 | 2/2017 |
| WO | WO 2017/042301 | A1 | 3/2017 |

OTHER PUBLICATIONS

European Patent Office, Extended European Search Report for European Patent Application No. 23200455.6, titled "Simulated Training Model for Laparoscopic Procedures," dated Dec. 4, 2023, 7 pgs.

European Patent Office, Extended European Search Report for European Patent Application No. 23180886.6, titled "Simulated Dissectible Tissue," dated Dec. 21, 2023, 14 pgs.

European Patent Office, Extended European Search Report for European Patent Application No. 23186659.1, titled "Hysterectomy Model," dated Mar. 5, 2024, 11 pgs.

(56) References Cited

OTHER PUBLICATIONS

European Patent Office, International Search Report for International Application No. PCT/US2011/053859 A3, mailed on Apr. 5, 2012, entitled "Portable Laparoscopic Trainer.".
European Patent Office, The International Search Report and Written Opinion for International Application No. PCT/US2012/60997, mailed Mar. 7, 2013, entitled "Simulated Tissue Structure for Surgical Training."
European Patent Office, The International Search Report and Written Opinion for International Application No. PCT/US2012/070971, mailed Mar. 18, 2013, entitled "Advanced Surgical Simulation."
Human Patient Simulator, Medical Education Technologies, Inc., http://www.meti.com (1999) all.
The International Bureau of WIPO, International Preliminary Report on Patentability and Written Opinion for International Application No. PCT/US2011/053859, titled "Portable Laparoscopic Trainer" dated Apr. 2, 2013.
European Patent Office, The International Search Report and Written Opinion for International Application No. PCT/US2013/062363, mailed Jan. 22, 2014, entitled "Surgical Training Model for Laparoscopic Procedures."
European Patent Office, The International Search Report and Written Opinion for International Application No. PCT/US2013/061949, mailed Feb. 17, 2014, entitled "Surgical Training Model for Laparoscopic Procedures."
Anonymous: Realsim Systems—LTS2000, Sep. 4, 2005, pp. 1-2, XP055096193, Retrieved from the Internet: URL:https://web.archive.org/web/2005090403;3030/http://www.realsimsystems.com/exersizes.htm (retrieved on Jan. 14, 2014).
European Patent Office, The International Search Report and Written Opinion for International Application No. PCT/US2013/062269, mailed Feb. 17, 2014, entitled "Surgical Training Model for Transluminal Procedures."
European Patent Office, The International Search Report and Written Opinion for International Application No. PCT/US2013/061557, mailed Feb. 10, 2014, entitled "Surgical Training Model for Laparoscopic Procedures."
European Patent Office, The International Search Report and Written Opinion for International Application No. PCT/US2013/061728 mailed Oct. 18, 2013, entitled "Surgical Training Model for Laparoscopic Procedures."
Limps and Things, EP Guildford MATTU Hernia Trainer, http://limbsandthings.com/us/products/tep-guildford-mattu-hernia-trainer/.
Simulab, Hernia Model, http://www.simulab.com/product/surgery/open/hernia model.
McGill Laparoscopic Inguinal Hernia Simulator, Novel Low-Cost Simulator for Laparoscopic Inguinal Hernia Repair.
University of Wisconsin-Madison Biomedical Engineering, Inguinal Hernia Model, http://bmedesign.engr.wisc.edu/projects/s10/hernia_model/.
The International Bureau of WIPO, International Preliminary Report on Patentability for International Application No. PCT/US2012/070971, titled "Advanced Surgical Simulation" dated Jun. 24, 2014.
European Patent Office, The International Search Report and Written Opinion of the International Searching Authority for International Application No. PCT/US2014/038195 titled "Hernia Model", mailed Oct. 15, 2014.
European Patent Office, The International Search Report and Written Opinion of the International Searching Authority for International Application No. PCT/US2014/048027 titled "First Entry Model", mailed Oct. 17, 2014.
The International Bureau of WIPO, International Preliminary Report on Patentability for International Application No. PCT/US2012/060997, titled "Simulated Tissue Structure For Surgical Training" dated Apr. 22, 2014.
European Patent Office, The International Search Report and Written Opinion for International Application No. PCT/US2014/019840 mailed Jul. 4, 2014 entitled "Advanced Surgical Simulation Constructions and Methods."
Kurashima Y et al, "A tool for training and evaluation of Laparoscopic inguinal hernia repair; the Global Operative Assessment of Laparoscopic Skills—Groin Hernia" American Journal of Surgery, Paul Hoeber, New York, NY, US vol. 201, No. 1, Jan. 1, 2011, pp. 54-61 XP027558745.
European Patent Office, The International Search Report and Written Opinion for International Application No. PCT/US2014/042998, title; Gallbladder Model, mailed Jan. 7, 2015.
The International Bureau of WIPO, International Preliminary Report on Patentability, for PCT application No. PCT/US2013/053497, titled, Simulated Stapling and Energy Based Ligation for Surgical Training, mailed Feb. 12, 2015.
The International Bureau of WIPO, International Preliminary Report on Patentability for International Application No. PCT/US2013/062363, titled Surgical Training Model for Laparoscopic Procedures, mailed Apr. 9, 2015.
The International Bureau of WIPO, International Preliminary Report on Patentability for International Application No. PCT/US2013/062269, titled Surgical Training Model for Laparoscopic Procedures, mailed Apr. 9, 2015.
The International Bureau of WIPO, International Preliminary Report on Patentability for International Application No. PCT/US2013/061557, titled Surgical Training Model for Laparoscopic Procedures, mailed Apr. 9, 2015.
The International Bureau of WIPO, International Preliminary Report on Patentability for International Application No. PCT/US2013/061728, titled Surgical Training Model for Laparoscopic Procedures, mailed Apr. 9, 2015.
The International Bureau of WIPO, International Preliminary Report on Patentability for International Application No. PCT/US2013/061949, titled Surgical Training Model for Laparoscopic Procedures, mailed Apr. 9, 2015.
The International Bureau of WIPO, International Preliminary Report on Patentability for International Application No. PCT/US2014/019840, titled "Simulated Tissue Structure For Surgical Training" dated Sep. 11, 2015.
European Patent Office, The International Search Report and Written Opinion for International Application No. PCT/US2015/020574, titled "Advanced First Entry Model for Surgical Simulation," mailed Jun. 1, 2015.
European Patent Office, The International Search Report and Written Opinion for International Application No. PCT/US2015/022774, mailed Jun. 11, 2015 entitled "Simulated Dissectible Tissue."
Anonymous: Silicone rubber-from Wikipedia, the free encyclopedia, pp. 1-6, XP055192375, Retrieved from the Internet: URL:http://en.wikipedia.org/w.index.php?title=Silicone_rubber&oldid=596456058 (retrieved on May 29, 2015).
Lamouche, et al., "Review of tissue simulating phantoms with controllable optical, mechanical and structural properties for use in optical coherence tomography," Biomedical Optics Express, Jun. 1, 2012, 18 pgs., vol. 3, No. 6.
The International Bureau of WIPO, International Preliminary Report on Patentability for International Application No. PCT/US2014/038195, titled Hernia Model, mailed Nov. 26, 2015.
The International Bureau of WIPO, International Preliminary Report on Patentability for International Application No. PCT/US2014/042998, titled "Gallbladder Model" dated Dec. 30, 2015.
European Patent Office, International Search Report and Written Opinion for International Application No. PCT/US2013/053497 titled "Simulated Stapling and Energy Based Ligation for Surgical Training" dated Nov. 5, 2013.
The International Bureau of WIPO, International Preliminary Report on Patentability for International Application No. PCT/US2014/048027, titled "First Entry Model" dated Feb. 4, 2016.
European Patent Office, International Search Report and Written Opinion for International Application No. PCT/US2015/059668 titled "Simulated Tissue Models and Methods" dated Apr. 26, 2016.

(56) References Cited

OTHER PUBLICATIONS

Society of Laparoendoscopic Surgeons, "Future Technology Session: The Edge of Innovation in Surgery, Space, and Business" http://www.laparoscopytoday.com/endourology/page/2/ , Figure 1B: http://laparoscopy.blogs.com/laparoscopy_today/images/6-1/6-1 VlaovicPicB.jpg , Sep. 5-8, 2007, 10 pgs.
Miyazaki Enterprises, "Miya Model Pelvic Surgery Training Model and Video," www.miyazakienterprises, printed Jul. 1, 2016, 1 pg.
Australian Patent Office, Patent Examination Report No. 1 for Australian Application No. 2012358851 titled "Advanced Surgical Simulation" dated May 26, 2016, 3 pgs.
European Patent Office, International Search Report and Written Opinion for International Application No. PCT/US2016/032292 titled "Synthetic Tissue Structures for Electrosurgical Training and Simulation," dated Jul. 14, 2016, 11 pgs.
European Patent Office, International Search Report and Written Opinion for International Application No. PCT/US2016/018697 titled "Simulated Tissue Structures and Methods," dated Jul. 14, 2016, 21 pgs.
European Patent Office, International Search Report and Written Opinion for International Application No. PCT/US2016/034591 titled "Surgical Training Model for Laparoscopic Procedures," dated Aug. 8, 2016, 18 pgs.
European Patent Office, The International Search Report and Written Opinion of the International Searching Authority for International Application No. PCT/US2016/036664 titled "Hysterectomy Model", mailed Aug. 19, 2016, 15 pgs.
The International Bureau of WIPO, International Preliminary Report on Patentabilityfor International Application No. PCT/US2015/020574, entitled "Advanced First Entry Model for Surgical Simulation," dated Sep. 22, 2016, 9 pgs.
European Patent Office, The International Search Report and Written Opinion of the International Searching Authority for International Application No. PCT/US2016/0043277 titled "Appendectomy Model", mailed Oct. 4, 2016, 12 pgs.
The International Bureau of WIPO, International Preliminary Report on Patentability for International Application No. PCT/US2015/022774, titled "Simulated Dissectible Tissue," dated Oct. 6, 2016, 9 pgs.
European Patent Office, The International Search Report and Written Opinion of the International Searching Authority for International Application No. PCT/US2016/041852 titled "Simulated Dissectible Tissue", mailed Oct. 13, 2016, 12 pgs.
3D-MED Corporation, "Validated Training Course for Laparoscopic Skills", https://www.3-dmed.com/sites/default/files/product-additional/product-spec/Validated%20Training%20Course%20for%20Laparoscopic%20Skills.docx_3.pdf, printed Aug. 23, 2016, pp. 1-6.
3D-MED Corporation, "Loops and Wire #1" https://www.3-dmed.com/product/loops-and-wire-1 , printed Aug. 23, 2016, 4 pgs.
Barrier, et al., "A Novel and Inexpensive Vaginal Hysterectomy Simulatory," Simulation in Healthcare: The Journal of the Society for Simulation in Healthcare, vol. 7, No. 6, Dec. 1, 2012, pp. 374-379.
European Patent Office, Invitation to Pay Additional Fees for International Application No. PCT/US2016/062669, titled "Simulated Dissectible Tissue", mailed Feb. 10, 2017, 8 pgs.
European Patent Office, The International Search Report and Written Opinion of the International Searching Authority for International Application No. PCT/US2016/055148 titled "Hysterectomy Model", mailed Feb. 28, 2017, 12 pgs.
European Patent Office, Examination Report for European Application No. 14733949.3 titled "Gallbladder Model," mailed Dec. 21, 2016, 6 pgs.
European Patent Office, The International Search Report and Written Opinion of the International Searching Authority for International Application No. PCT/US2016/062669 titled "Simulated Dissectible Tissue," mailed Apr. 5, 2017, 19 pgs.
European Patent Office, The International Search Report and Written Opinion of the International Searching Authority for International Application No. PCT/US2017/020389 titled "Simulated Tissue Cartridge", mailed May 24, 2017, 13 pgs.
The International Bureau of WIPO, International Preliminary Report on Patentability and Written Opinion for International Application No. PCT/US2015/059668, entitled "Simulated Tissue Models and Methods," dated May 26, 2017, 16 pgs.
The International Bureau of WIPO, International Preliminary Report on Patentability for International Application No. PCT/US2016/018697, entitled "Simulated Tissue Structures and Methods," dated Aug. 31, 2017, 14 pgs.
The International Bureau of WIPO, International Preliminary Report on Patentability for International Application No. PCT/US2016/0032292, entitled "Synthetic Tissue Structures for Electrosurgical Training and Simulation," dated Nov. 23, 2017, 2017, 8 pgs.
The International Bureau of WIPO, International Preliminary Report on Patentability for International Application No. PCT/US2016/034591, entitled "Surgical Training Model for Laparoscopic Procedures," dated Dec. 7, 2017, 2017, 14 pgs.
The International Bureau of WIPO, International Preliminary Report on Patentability for International Application No. PCT/US2016/036664, entitled "Hysterectomy Model," dated Dec. 21, 2017, 10 pgs.
The International Bureau of WIPO, International Preliminary Report on Patentability for International Application No. PCT/US2016/041852, entitled "Simulated Dissectible Tissue," dated Jan. 25, 2018, 12 pgs.
European Patent Office, Extended European Search Report for European Patent Application No. EP 17202365.7, titled "Gallbladder Model", dated Jan. 31, 2018, 8 pgs.
The International Bureau of WIPO, International Preliminary Report on Patentability for International Application No. PCT/US2016/043277, entitled "Appendectomy Model," dated Feb. 1, 2018, 9 pgs.
The International Bureau of WIPO, International Preliminary Report on Patentability for International Application No. PCT/US2016/055148, entitled "Hysterectomy Model," dated Apr. 12, 2018, 12 pgs.
European Patent Office, The International Search Report and Written Opinion for International Application No. PCT/US2018/018895, entitled "Synthetic Tissue Structures for Electrosurgical Training and Simulation," mailed May 17, 2018, 12 pgs.
The International Bureau of WIPO, International Preliminary Report on Patentability for International Application No. PCT/US2016/062669, entitled "Simulated Dissectible Tissue," dated May 31, 2018, 11 pgs.
European Patent Office, The International Search Report and Written Opinion for International Application No. PCT/US2018/018036, entitled "Laparoscopic Training System," mailed Jun. 8, 2018, 13 pgs.
European Patent Office, The International Search Report and Written Opinion forInternational Application No. PCT/US2017/039113, entitled "Simulated Abdominal Wall," mailed Aug. 7, 2017, 13 pgs.
European Patent Office, Extended European Search Report for European Patent Application No. EP 18177751.7, titled "Portable Laparoscopic Trainer," dated Jul. 13, 2018, 8 pgs.
European Patent Office, The International Search Report and Written Opinion for International Application No. PCT/US2018/034705, entitled "Laparoscopic Training System," mailed Aug. 20, 2018, 14 pgs.
The International Bureau of WIPO, International Preliminary Report on Patentabilityfor International Application No. PCT/US2017/020389, entitled "Simulated Tissue Cartridge," dated Sep. 13, 2018, 8 pgs.
European Patent Office, Extended European Search Report for European Patent Application No. EP 18184147.9, titled "First Entry Model," dated Nov. 7, 2018, 7 pgs.
The International Bureau of WIPO, International Preliminary Report on Patentability for International Application No. PCT/US2017/039113, entitled "Simulated Abdominal Wall," dated Jan. 10, 2019, 8 pgs.
European Patent Office, Extended European Search Report for European Patent Application No. EP 18210006.5, titled "Surgical Training Model for Laparoscopic Procedures," dated Jan. 21, 2019, 7 pgs.

(56) References Cited

OTHER PUBLICATIONS

European Patent Office, Extended European Search Report for European Patent Application No. EP 18207214.0, titled "Synthetic Tissue Structures for Electrosurgical Training and Simulation," dated Mar. 28, 2019, 6 pgs.
European Patent Office, Extended European Search Report for European Patent Application No. EP 18216002.8, titled "Surgical Training Model for Laparoscopic Procedures," dated Feb. 4, 2019, 6 pgs.
European Patent Office, Extended European Search Report for European Patent Application No. EP 18216005.1, titled "Surgical Training Model for Laparoscopic Procedures," dated Feb. 4, 2019, 7 pgs.
European Patent Office, Extended European Search Report for European Patent Application No. EP 19159065.2, titled "Simulated Tissue Structures and Methods," dated May 29, 2019, 8 pgs.
The International Bureau of WIPO, International Preliminary Report onPatentability for International Application No. PCT/US2018/018036, entitled "Laparoscopic Training System," dated Aug. 29, 2019, 8 pgs.
The International Bureau of WIPO, International Preliminary Report on Patentability for International Application No. PCT/US2018/018895, entitled "Synthetic Tissue Structures for Electrosurgical Training and Simulation," dated Sep. 6, 2019, 7 pgs.
European Patent Office, Extended European Search Report for European Patent Application No. EP 20153338.7, titled "Advanced Surgical Simulation Constructions and Methods," dated Mar. 5, 2020, 7 pgs.
European Patent Office, Extended European Search Report for European Patent Application No. EP 19215545.5, titled "Advanced First Entry Model for Surgical Simulation," dated Mar. 26, 2020, 8 pgs.
European Patent Office, Extended European Search Report for European Patent Application No. EP 20158500.7, titled "Surgical Training Device," dated May 14, 2020, 9 pgs.
European Patent Office, Extended European Search Report for European Patent Application No. EP 20186713.2, titled "Simulated Dissectible Tissue," dated Nov. 10, 2020, 12 pgs.

"Surgical Female Pelvic Trainer (SFPT) with Advanced Surgical Uterus," Limbs & Things Limited, Issue 1, Jul. 31, 2003, URL:https://www.accuratesolutions.it/wp-content/uploads/2012/08/Surgical_Female_Pelvic_Trainer_SFPT_with_Advanced_Uterus_User_Guide.pdf, retrieved Feb. 21, 2020, 2 pgs.
European Patent Office, Extended European Search Report for European Patent Application No. 21159294.4, titled "Surgical Training Model for Laparoscopic Procedures," dated Apr. 5, 2021, 7 pgs.
Condino et al.; "How to build patient-specific synthetic abdominal anatomies. An innovative approach from physical toward hybrid surgical simulators," The International Journal of Medical Robotics and Computer Assisted Surgery, Apr. 27, 2011, vol. 7, No. 2, pp. 202-213.
Wilkes et al.; "Closed Incision Management with Negative Pressure Wound Therapy (CIM): Biomechanics," Surgical Innovation 19(1), URL:https://journals.sagepub.com/doi/pdf/10.1177/1553350611414920, Jan. 1, 2012, pp. 67-75.
European Patent Office, Extended European Search Report for European Patent Application No. EP 21182654.0, titled "Simulated Dissectible Tissue," dated Oct. 22, 2021, 13 pgs.
European Patent Office, Extended European Search Report for European Patent Application No. EP 21191452.8, titled "Advanced Surgical Simulation Constructions and Methods," dated Dec. 13, 2021, 8 pgs.
European Patent Office, Extended European Search Report for European Patent Application No. EP 22151452.4, titled "Portable Laparoscopic Trainer," dated Apr. 13, 2022, 8 pgs.
European Patent Office, Extended European Search Report for European Patent Application No. EP 22172093.1, titled "Hysterectomy Model," dated Jul. 20, 2022, 9 pgs.
European Patent Office, Extended European Search Report for European Patent Application No. 22212824.1, titled "Surgical Training Model for Laparoscopic Procedures," dated Feb. 28, 2023, 20 pgs.
European Patent Office, Extended European Search Report for European Patent Application No. 22214865.2, titled "Gallbladder Model," dated Feb. 28, 2023, 18 pgs.

\* cited by examiner

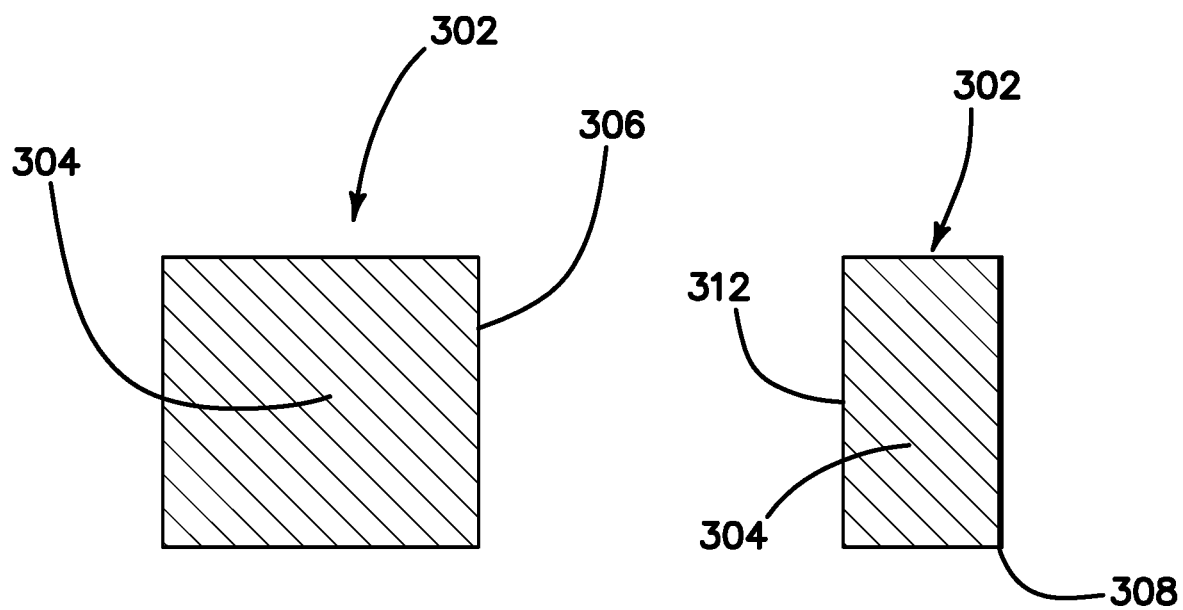
FIG. 26A
FIG. 26B
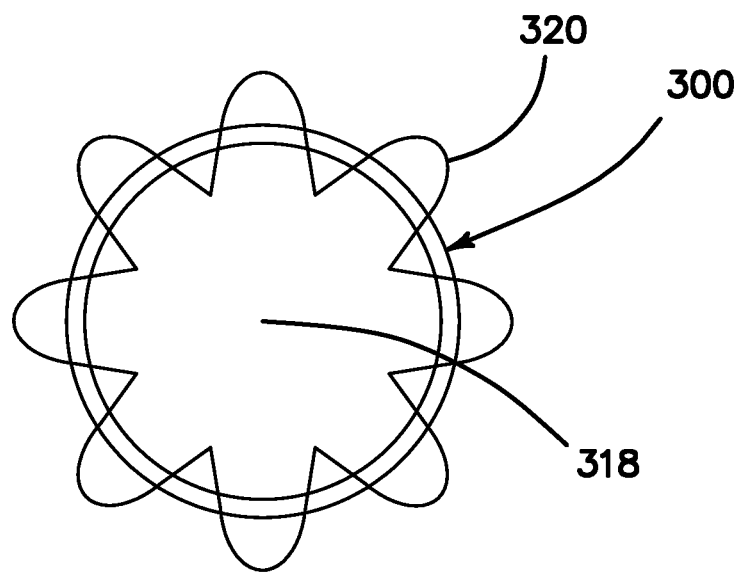
FIG. 29

SIMULATED TISSUE MODELS AND METHODS

CROSS-REFERENCE TO RELATED APPLICATIONS

This application is a continuation of U.S. patent application Ser. No. 17/081,820 entitled "Simulated tissue models and methods" filed on Oct. 27, 2020, which is a continuation of U.S. patent application Ser. No. 15/133,822 entitled "Simulated tissue models and methods" filed on Apr. 20, 2016, now issued as U.S. Pat. No. 10,818,201, which is a continuation of International Application No. PCT/US2015/059668 entitled "Simulated tissue models and methods" filed on Nov. 9, 2015, incorporated herein by reference in its entirety, which claims priority to and benefit of U.S. Provisional Patent Application Ser. No. 62/089,919 entitled "Suturable rectum model" filed on Dec. 10, 2014, incorporated herein by reference in its entirety; this application claims priority to and benefit of U.S. Provisional Patent Application Ser. No. 62/079,523 entitled "Fully suturable rectum" filed on Nov. 13, 2014, incorporated herein by reference in its entirety; this application claims priority to and benefit of U.S. Provisional Patent Application Ser. No. 62/079,479 entitled "One piece polyp simulation" filed on Nov. 13, 2014, incorporated herein by reference in its entirety; this application claims priority to and benefit of U.S. Provisional Patent Application Ser. No. 62/118,179 entitled "Method of making simulated tissue using stencils" filed on Feb. 19, 2015, incorporated herein by reference in its entirety.

FIELD

This application is generally related to surgical training tools, and in particular, to anatomical models simulating organs or tissue for teaching and practicing various surgical techniques and procedures.

BACKGROUND

Medical students as well as experienced doctors learning new surgical techniques must undergo extensive training before they are qualified to perform surgery on human patients. The training must teach proper techniques employing various medical devices for cutting, penetrating, clamping, grasping, stapling and suturing a variety of tissue types. The range of possibilities that a trainee may encounter is great. For example, different organs and patient anatomies and diseases are presented. The thickness and consistency of the various tissue layers will also vary from one part of the body to the next and from one patient to another. Accordingly, the skills required of the techniques and instruments will also vary. Furthermore, the trainee must practice techniques in readily accessible open surgical locations and in locations accessed laparoscopically.

Numerous teaching aids, trainers, simulators and model organs are available for one or more aspects of surgical training. However, there is a need for model organs or simulated tissue elements that are likely to be encountered in endoscopic, laparoscopic, transanal, minimally invasive or other surgical procedures that include the removal of tumors or other tissue structures. In particular, there is a need for realistic model organs for the repeatable practice of removing a tumor or other undesired tissue followed by the closure of the target area by suturing or stapling as part of the same surgical procedure. In view of the above, it is an object of this invention to provide a surgical training device that realistically simulates such particular circumstances encountered during surgery.

SUMMARY

According to one aspect of the invention, a simulated tissue structure for surgical training is provided. The structure includes a first layer made of silicone having a substantially planar first surface opposite a substantially planar second surface defining a first thickness therebetween. The first layer has an outer perimeter and a protrusion extending outwardly from the first surface at a protrusion location inside the outer perimeter. The first thickness is substantially uniform and the protrusion being defined by an increased first thickness of the first layer. The structure includes a second layer made of silicone having a substantially planar first surface opposite a substantially planar second surface defining a second thickness therebetween. The second thickness is substantially uniform. The second layer has an outer perimeter and is connected to the first layer such that the outer perimeter of the first layer and the outer perimeter of the second layer are aligned and the first surface of the second layer faces and contacts the second surface of the first layer. The first layer and the second layer are adhered together with adhesive located around the protrusion location such that the first layer and second layer are separable at the protrusion location to facilitate excision of the protrusion.

According to another aspect of the invention, a simulated tissue structure for surgical training is provided. The simulated tissue structure includes a substantially cylindrical tube having a sidewall with an inner surface and an outer surface extending between a proximal end and a distal end and defining a central lumen having a longitudinal axis. At least one of the proximal end and distal end is open. The cylindrical tube includes at least one aperture extending across the sidewall from the inner surface to the outer surface. The structure includes at least one pod that is sized and configured for insertion into the at least one aperture. The pod is also configured for removable connection with the cylindrical tube. The pod includes a cap and a simulated tissue connected to the cap. The cap includes a frame having a flange and defining an opening. The simulated tissue includes at least one planar layer of silicone having an inner surface and an outer surface. The simulated tissue is connected to the flange such that the outer surface of the simulated tissue is connected to the flange and the simulated tissue spans the opening defined by the frame. The pod is removably connected to the cylindrical tube such that the simulated tissue is aligned with the inner surface of the sidewall when connected to the cylindrical tube.

According to another aspect of the invention, a method for manufacturing a simulated tissue model is provided. The method includes the steps of providing an elongated mandrel having an outer surface with at least one depression, rotating the mandrel, applying a first layer of uncured silicone on the mandrel, and allowing the first layer to cure to form a substantially tubular structure having an inner surface and an outer surface and a well having a depth formed in the outer surface in the location of the depression. The method further includes the steps of providing a second layer of cured silicone having a shape substantially corresponding to the shape of the well and a thickness substantially corresponding to the depth of the well, placing the second layer inside the well of the first layer, applying a third layer of uncured silicone on the outer surface of the first layer and second layer, and allowing the third layer to cure and adhere to the first layer and second layer to form a smooth outer surface. The method further includes the steps of providing a simulated tumor having a size smaller than the second layer, and attaching a simulated tumor to the inner surface of the first layer in the location of the depression adjacent to the second layer.

According to another aspect of the invention, a method for manufacturing a simulated tissue model is provided. The method includes the steps of providing an elongated mandrel having an outer surface, rotating the mandrel, applying a first layer of uncured silicone on the mandrel, allowing the first layer to cure to form a substantially tubular structure having an inner surface and an outer surface. The method further includes the steps of providing a simulated tumor having a size smaller than the first layer, and attaching the simulated tumor to a location on the inner surface of the first layer. The method further includes the steps of providing a second layer of cured silicone having a size larger than the size of the tumor, and placing the second layer on the outer surface of the first layer in a location opposite from the location of the tumor.

According to another aspect of the invention, a method for manufacturing a simulated tissue model is provided. The method includes the steps of providing an elongated mandrel having an outer surface with at least one outward detent, rotating the mandrel, applying a first layer of uncured silicone on the mandrel, and allowing the first layer to cure to form a substantially tubular structure having an inner surface forming a lumen and an outer surface and a well having a depth formed in the inner surface in the location of the outward detent. The method further includes the steps of providing a polyp simulation, and placing the polyp simulation inside the well of the first layer.

BRIEF DESCRIPTION OF THE DRAWINGS

FIG. 26A is a top planar view of a mesh layer of a tissue simulation model according to the present invention.

FIG. 26B is a top planar view of a mesh layer of a tissue simulation model formed into a cylindrical sleeve according to the present invention.

FIG. 29 illustrates a sectional end view of a fully suturable rectum model with an exemplary suture pathway according to the present invention.

DETAILED DESCRIPTION

Figure 1:
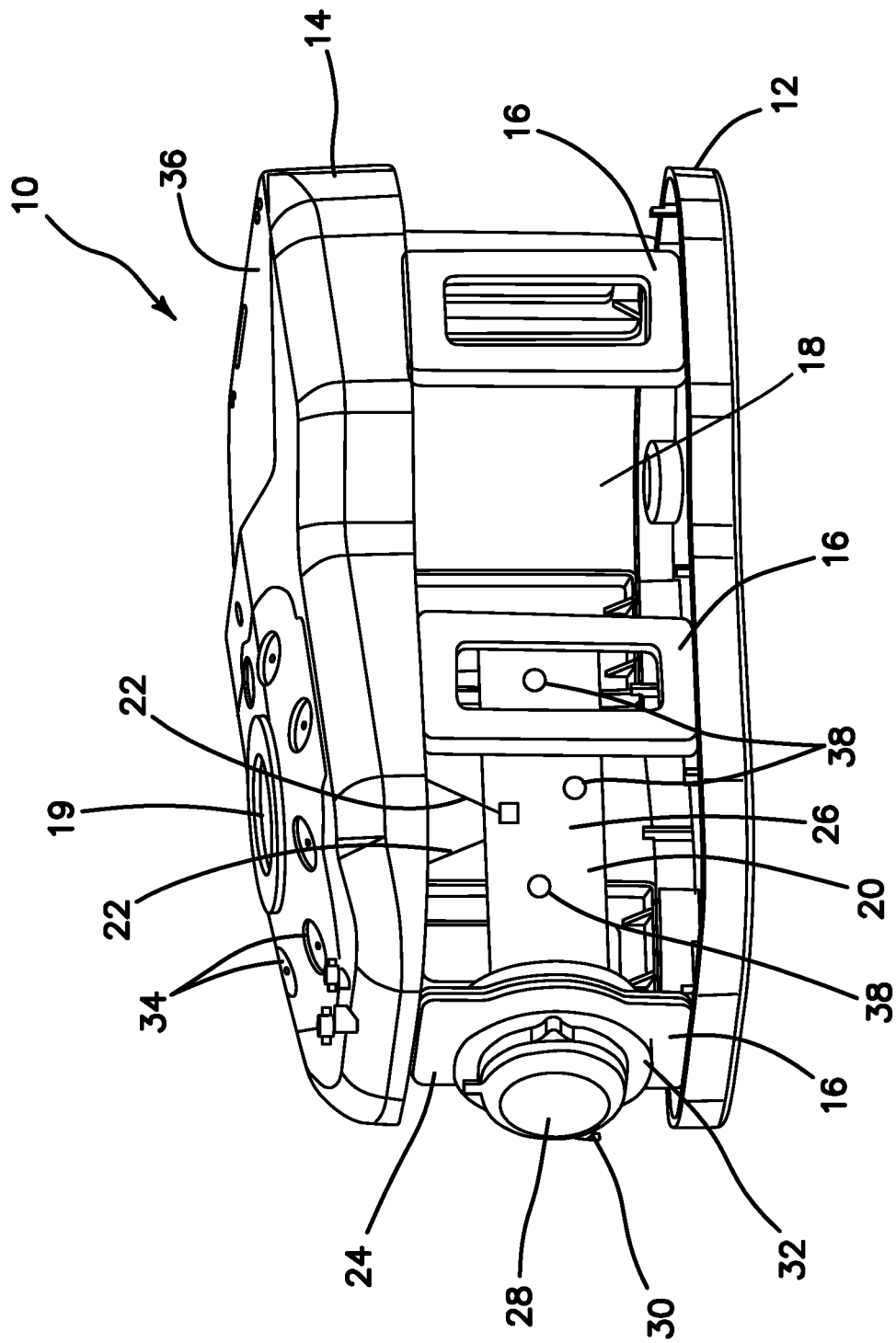
FIG. 1 illustrates a side view of a surgical training device with a model organ according to the present invention.

A surgical training device 10 that is configured to mimic the torso of a patient such as the abdominal region is shown in FIG. 1. The surgical training device 10 provides a simulated body cavity 18 substantially obscured from the user for receiving model organs or simulated or live tissue 20. The body cavity 18 is accessed via a tissue simulation region 19 that is penetrated by the user employing devices to practice surgical techniques on the tissue or organ 20 found located in the body cavity 18. Although the body cavity 18 is shown to be accessible through a tissue simulation region 19, a hand-assisted access device or single-site port device may be alternatively employed to access the body cavity 18 as described in U.S. patent application Ser. No. 13/248,449 entitled "Portable Laparoscopic Trainer" filed on Sep. 29, 2011 and incorporated herein by reference in its entirety. The surgical training device 10 is particularly well suited for practicing laparoscopic or other minimally invasive surgical procedures.

The surgical training device 10 includes a base 12 and a top cover 14 connected to and spaced apart from the base 12 to define an internal body cavity 18 between the top cover 14 and the base 12. At least one leg 16 interconnects and spaces apart the top cover 14 and base 12. A model organ or simulated tissue 20 is disposed within the body cavity 18. The model organ 20 shown in FIG. 1 is a partial colon or intestine that is shown suspended from the top cover 14 by tethers 22 and connected to at least one leg 24. The at least one leg 24 has an aperture (not shown) facing the internal cavity 20. The model colon 20 includes a tube 26 having a proximal end and a distal end. The proximal end of the tube 26 is interconnected with the aperture of the leg 16 such that the aperture provides an access port to the lumen of the tube 26. The access port and aperture is shown to be closed off in FIG. 1 with an access device 28 which in combination with a sealed distal end of the tube 26 provides a model organ 20 that is adapted for insufflation with fluid deliverable via an insufflation port 30. An optional insert 32 made of soft material such as silicone creates a realistic interface for the access port. The distal end of the tube 26 extends into the body cavity 18 and is suspended within the body cavity 18. The interior of the tube 26 of the simulated organ 20 is accessible via the access port of leg 24 or via the tissue simulation region 19 or instrument insertion ports 34. An endoscopic camera inserted into the body cavity 18 or into the organ 20 via the access port generates a live image for display on a fold out video screen 36 shown in the closed position in FIG. 1. Although the simulated organ 20 of FIG. 1 is ideal for practicing procedures related to transanal minimally invasive surgery, any simulated organ or tissue portion may be employed. One particular aspect of the organ 20 is at least one tumor or defect 38 is provided and connected to the organ. As shown in FIG. 1, the tumor 38 is connected to the wall of the organ tube 26.

Figure 2A:
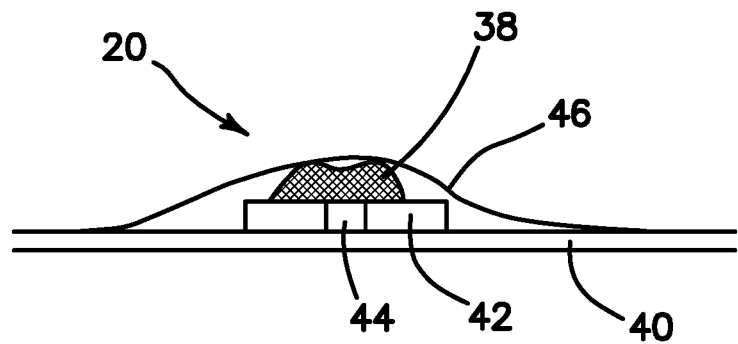
FIG. 2A illustrates a side cross-sectional view of a simulated tissue structure according to the present invention.

Turning now to FIG. 2A there is shown a partial side cross-sectional view of a portion of a simulated organ 20 that includes the tumor 38. The simulated organ or tissue 20 includes a base layer or organ wall 40. The organ wall 40 is made from a material configured to mimic real live tissue such as silicone or other polymer and is dyed appropriately. One or more base layers 40 of varying thicknesses and colorations may be employed to comprise the entirety of the wall 40. In one variation, the organ wall 40 is rigid and made of polymeric material. Above the base layer 40 is a second layer or defect layer 42. The defect layer 42 is the same size or smaller than the base layer 40 forming a raised platform for the tumor 38. The defect layer 42 is connected to the base layer 40 by adhesive or other means known to one having ordinary skill in the art including being integrally formed with the base layer 40 as a single unit. The defect layer 42 is made of silicone and in one variation of the same color as the base layer 40 such that the defect layer 42 blends into the background of the base layer 40. The defect layer 42 includes at least one defect or gap 44. In one variation, the defect 44 is a pre-fabricated breach in the defect layer 42 that mimics an incision, gap or other void in real tissue resulting from a tear, cut, removal or other surgical procedure that requires surgical attention by way of suturing, stapling or the like to close the defect. Such a situation arises most often in the removal of a tumor 38 where surrounding tissue is also removed together with the tumor 38 to preventatively ensure the entirety of the tumor is excised leaving behind a remnant defect in the tissue. The defect 44 comprises two opposed sides or surfaces defining a gap therebetween. Although the adjacent sides or surfaces are shown to be vertical with respect to the base layer 40, the invention is not so limited and the juxtaposed surfaces or sides can have any shape and, for example, be curved. The defect 44 can be any shape as will be discussed with respect to FIGS. 3A-3F.

Figure 3A:
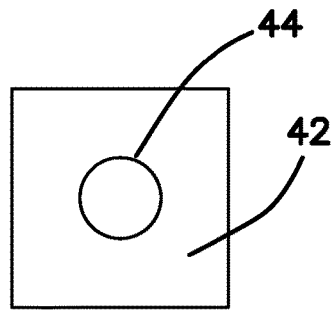
FIG. 3A illustrates a top view of a defect layer having a circular shaped defect according to the present invention.
Figure 3B:
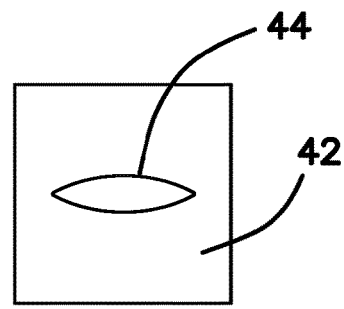
FIG. 3B illustrates a top view of a defect layer having an elongated defect according to the present invention.
Figure 3C:
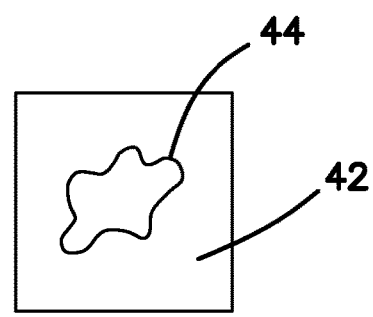
FIG. 3C illustrates a top view of a defect layer having an amorphous defect according to the present invention.
Figure 3D:
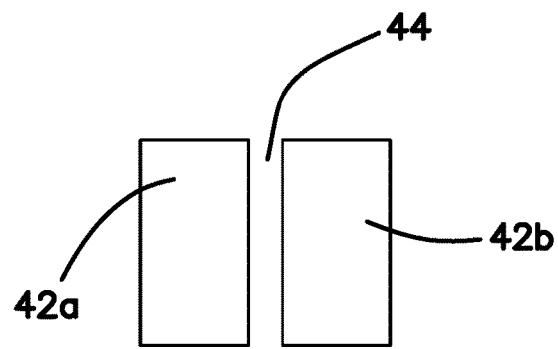
FIG. 3D illustrates a top view of a defect layer having a two-piece defect according to the present invention.
Figure 3E:
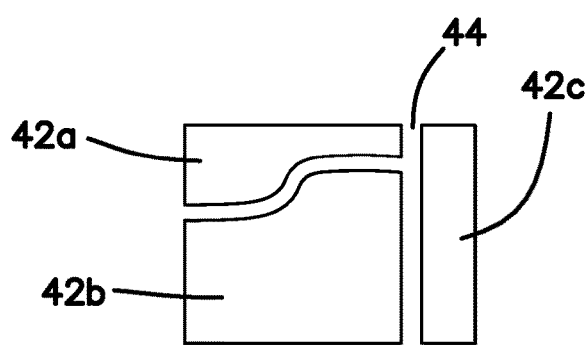
FIG. 3E illustrates a top view of a multi-part defect layer according to the present invention.
Figure 3F:
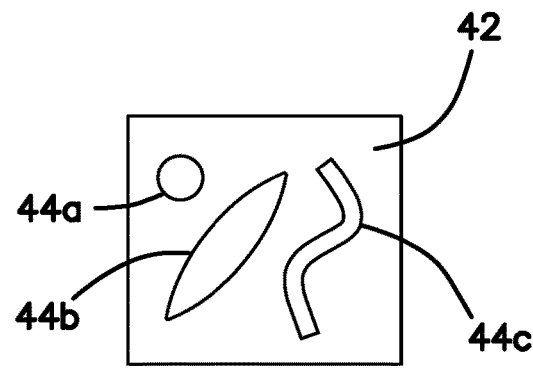
FIG. 3F illustrates a top view of a defect layer having multiple defects according to the present invention.

Turning now to FIG. 3A, there is shown a top view of a defect layer 42 having a circular defect 44. A defect layer 42 with an elongated, oblong or elliptically shaped defect 44 is shown in the FIG. 3B. The defect 44 can be amorphic or any shape as shown in FIG. 3C. The defect layer 42 may be multi-part as shown in FIG. 3D wherein the defect layer 42 includes two or more adjacent defect layer pieces 42a, 42b juxtaposed to create at least one defect 44 therebetween. Another multi-part defect layer 42 is shown in FIG. 3E where a plurality of adjacent defect layer pieces 42a, 42b and 42c form one or more defects 44 therebetween. Of course, a defect layer 42 may include multiple defects 44a, 44b and 44c as shown in FIG. 3F. The defects 44 may all be the same or have different shapes as shown in FIG. 3F. The shape, thickness and size of the defect allow the surgeon trainee to practice suturing across defects of varying difficulty. In one variation, the defect layer 42 is not of equal thickness. Instead, the thickness of the defect layer 42 varies at the defect location 48 to increase the difficulty of suturing or closing the defect.

Referring back to FIG. 2A, a tumor 38 is located above the defect layer 42. The tumor 38 is preferably a different color from the base layer 40 or defect layer 42 or both such that it is readily identifiable by the trainee. Preferably, the tumor 38 is made of silicone or other polymer material and is red, black, blue or dark brown in color. In general, the tumor 38 is of a darker color than the base or defect layers 40, 42 or otherwise in contrast therewith when viewed through a scope. In one variation, the tumor 38 is connected to the defect layer 42 by adhesive or other means known to one of ordinary skill in the art. In another variation, the tumor 38 is not connected or attached to the defect layer 42 but is removably located thereon.

Figure 4:
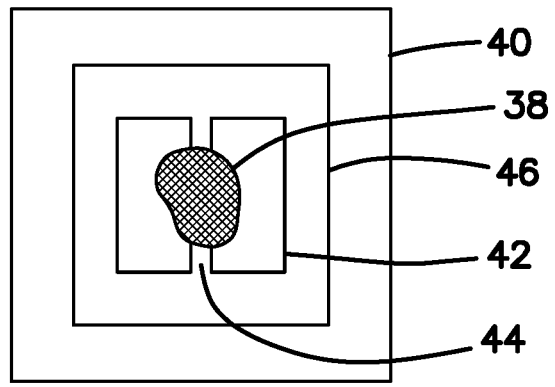
FIG. 4 illustrates a top view of a simulated tissue structure according to the present invention.

Still referencing FIG. 2A, the simulated tissue structure 20 includes a cover layer 46 located above the tumor 38. In one variation, the cover layer 46 overlays the tumor 38, defect layer 42 and the base layer 40. The cover layer 46 is preferably transparent or translucent in color and made of a polymer material such as silicone. In another variation, the cover layer 46 is the same color as the base layer 40 or defect layer 42. The cover layer 46 is at least as thick as the base layer 40 or defect layer 42 and in one variation is thinner than the defect layer 42 and in another variation is thinner than the base layer 40. The cover layer 46 is sized to cover the entire tumor 38 and defect layer 42 and is big enough to contact the base layer 40 in one variation. In another variation, the cover layer 46 is sized to cover the entire tumor 38 and contact the defect layer 40. The cover layer 46 is connected to the base layer 40, defect layer 42, tumor 38 or any more than one of the three layers by way of adhesive or other means known to one of ordinary skill in the art. In another variation, the cover layer 46 is smaller and connected to the defect layer 42 alone. In yet another variation, the cover layer 46 is connected to both the defect layer 42 and base layer 42 by adhesive or other means known to one of ordinary skill in the art. The cover layer 46 can be any shape or sized and be configured to provide a smooth surface to the surgeon instead of a layered surface to the artificial tumor location. The cover layer 46, tumor 38, defect layer 42 or base layer 40 includes surface texturing in one variation. Also, the cover layer 46 assists in keeping the tumor 38 and defect layer 42 sandwiched between the cover layer 46 and base layer 40 which is advantageous in a variation wherein the tumor 38 is not adhered to the defect layer 42. A top planar view of the base layer 40, defect layer 42, cover layer 46 and tumor 38 is shown in FIG. 4. In one variation, any one or more of the base layer 40, defect layer 42 and cover layer 46 is formed of silicone molded over a woven, fabric, or mesh material such as nylon or cheesecloth so that the silicone layer has an integrated mesh structural support or other type of reinforcement. Any one or more of the layers 38, 40, 42, 46 can include a fabric or mesh reinforcement combined with an elastic polymer such silicone. The mesh support aids in preventing the suture, staple, or suture needle from tearing through at least one of layers and especially the defect layer 42 when the suture is pulled to close the gap 44.

Figure 2B:
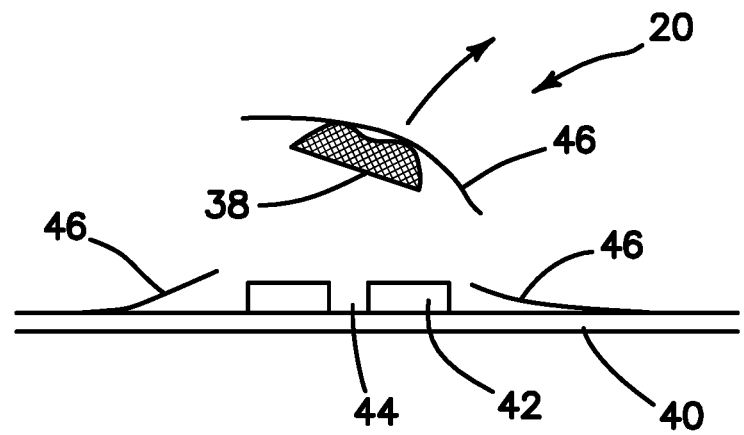
FIG. 2B illustrates a side cross-sectional view of a simulated tissue structure with tumor excised according to the present invention.
Figure 2C:
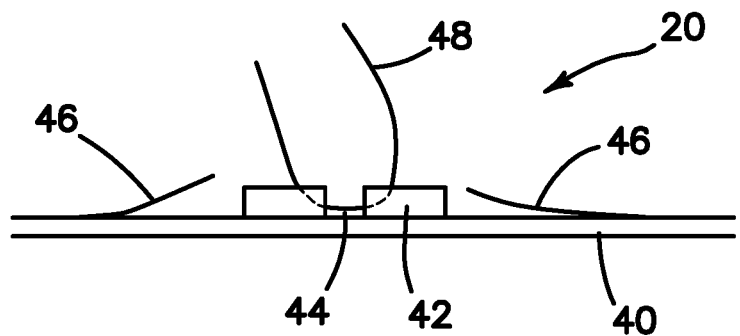
FIG. 2C illustrates a side cross-sectional view of a simulated tissue structure with an open suture according to the present invention.
Figure 2D:
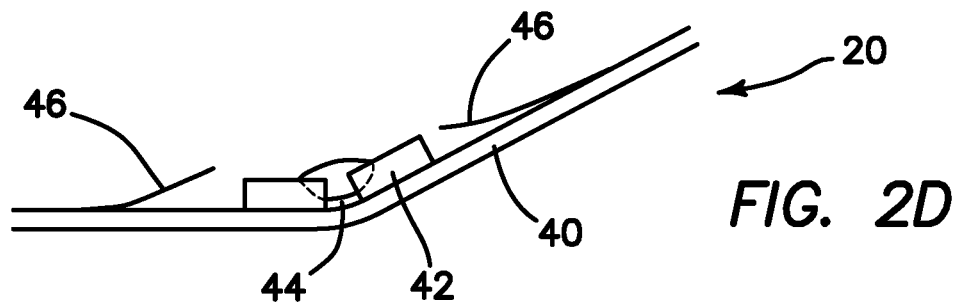
FIG. 2D illustrates a side cross-sectional view of a simulated tissue structure with a closed suture according to the present invention.

In FIG. 2B, the tumor 38 and a portion of the cover layer 46 are shown excised from the base layer 40. The excision is performed by the trainee using a surgical instrument such as a scalpel or other medical instrument to remove the tumor 38. The trainee will cut through the cover layer 46 around the tumor 38, isolate the tumor 38, lift and remove the tumor 38 away from the site to expose the underlying defect 44 as shown in FIG. 2B. Then, as shown in FIG. 2C the trainee sutures the defect 44 using a surgical suture 48 bringing the lips or edges of the defect layer 42 together as shown in FIG. 2D, thereby, practicing the closing of a gap or wound created by the surgical removal of a tumor 38. Cutting the at least one layer to create an opening and removing the artificial tumor and suturing the gap is performed while the simulated tissue structure is disposed inside a simulated body cavity 18 of a surgical training device such that the simulated tissue structure is at least partially obscured from view by the user.

Figure 5:
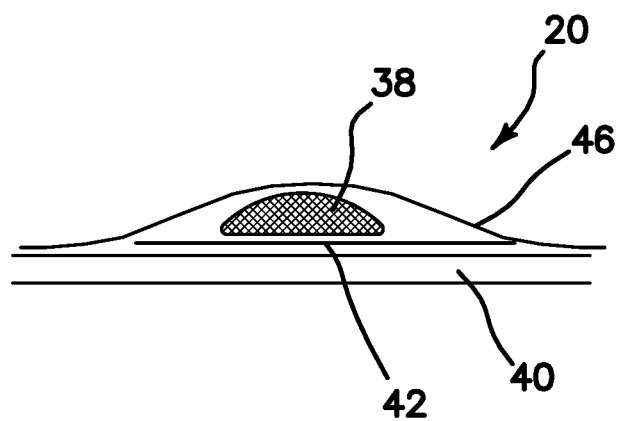
FIG. 5 illustrates a side cross-sectional view of a simulated tissue structure according to the present invention.

Turning now to FIG. 5, there is shown another variation in which there is no pre-formed gap or defect in the second or defect layer 42. Instead, upon excising the tumor 38, the defect is created by the user in one or more of the cover layer 46, defect layer 42, base layer 40 and any remaining tumor portion not removed by the user. The user would then practice suturing the created defect in any of these layers 38, 40, 42, 46. In one such variation, one of the defect layer 42 or base layer 40 is omitted from the construct. In another variation, the tumor 38 is located on a base layer 40 and the defect layer 42 is placed over the tumor 38 such that the defect layer 42 is above the tumor 38. In such a variation, a cover layer 46 may or may not be included. If a cover layer 46 is included it may be integrally formed together with the defect layer as a separate unitary layer. In any of the constructs described above with respect to FIGS. 2-5, the constructs may be flipped upside down or otherwise the layers placed in reverse or otherwise the construct being approachable by the user from either the top or bottom direction with the thicknesses and colors of the layers being adjusted accordingly if necessary to provide the simulated effects of real tissue.

Figure 6A:
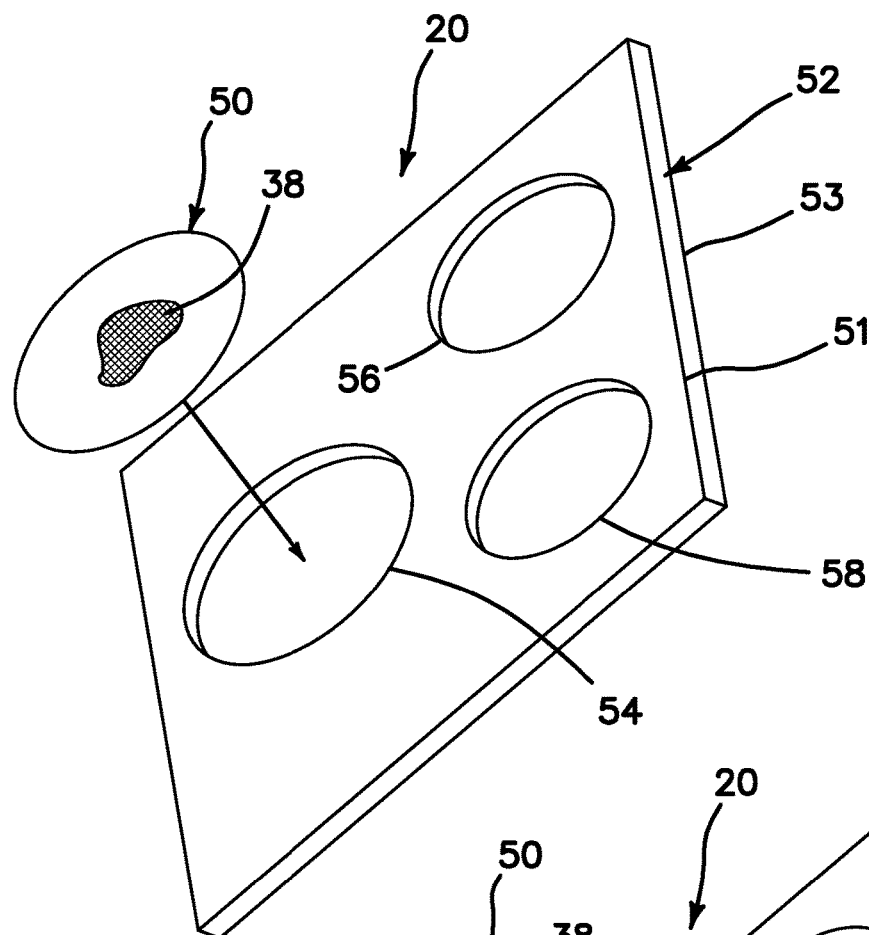
FIG. 6A illustrates a perspective view of a modular tissue structure and support according to the present invention.
Figure 6B:
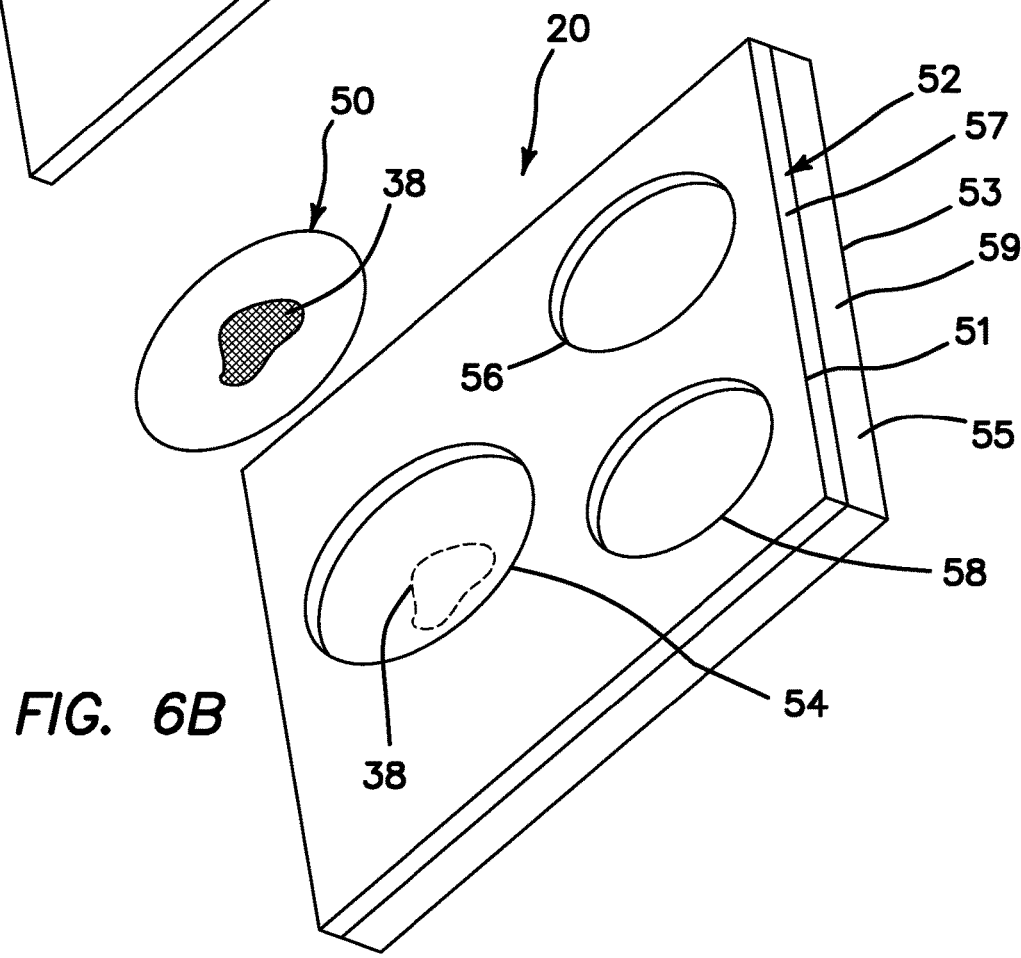
FIG. 6B illustrates a perspective view of a modular tissue structure and support according to the present invention.

Turning now to FIGS. 6A and 6B, in any of the variations in this description, the simulated tissue construct can be modular such that it is not integrally formed with the entire simulated organ 20 but instead configured as a module 50 that is removable and interchangeable. One or more modules 50 are supported or contained in a module support 52. A module support 52 includes a first surface 51, a second surface 53 and one or more tumor module receiving portions 54, 56, 58 formed in the support 52. The tumor support 52 can be rigid or pliable and made of polymeric material. The tumor support 52 may also comprise a sheet of elastomeric material. The module receiving portions 54, 56, 58 are each sized and configured to receive a correspondingly sized and configured module 50. The modules 50 and module receiving portions 54, 56, 48 in FIG. 6 are shown to be circular; however, the tumor module 50 can be any shape with a complementary shaped receiving portion formed in the module support 52. The thickness of the support 52 can vary providing the construct with varying depths of tumor module 50 positioning. The module receiving portions 54, 56, 58 may include bottom walls onto which the tumor modules 50 may rest. Alternatively, the tumor receiving portions 54, 56, 58 extend between openings in the first surface 51 and the second surface 53 with the modules 50 with tumor 38 being connected between or at one of the openings at either surface 51, 53 or suspended within the tumor receiving portion. In one variation, a single tumor module 50 includes one or more tumors 38. The module support 52 is loaded with one or more tumor modules 50 and the simulated tissue construct 20 is inserted into the body cavity 18 of the surgical training device 10, framework or other torso model. It can be placed on the base 12 of the training device 10 or suspended within the body cavity 18 of the training device 10. The simulated tissue construct 20 and/or training device is fashioned with attachment mechanisms such as clips, fasteners, wires, hook-and-loop type fasteners and the like for placement, suspension or connection of the simulated tissue construct 20 to a training device 10.

With particular reference to FIG. 6B, there is shown a module support 52 that includes more than one layer. The module support 52 of FIG. 6B includes a first layer 57 connected to a second layer 55. In one variation, the first layer 57 is made of a sheet of elastomeric material and the second layer 55 is made of any suitable polymeric material such as low-density elastomeric foam. The second layer 55 serves as a support for the first layer 57. The second layer 55 also advantageously provides depth to the module support 52 permitting the tumors 38 within the modules 50 to be placed deeply into the module support 52 relative to the first surface 51. Module receiving portions 54, 56, 58 are formed in one or more than one of the first layer 57 and the second layer 55. Module receiving portions 54, 56, 58 formed in the second layer 55 may have a different shape than the shape the same module receiving portion 54, 56, 58 has in the first layer 57. In one variation, the tumor module 50 comprises at least only the simulated tumor 38 which is embedded or buried inside the second layer 55 with at least one of the first layer 57 or second layer 55 constituting a defect layer which the user can practice closing. As an alternative, the first layer 57 does not include a module receiving portion but instead the first layer 57 serves as a cover layer which the user practices cutting through to access the tumor 38 located in a tumor receiving portion formed in the second layer 55. In such variation, the first layer 57 can be a sheet of elastomeric material such as silicone and the second layer 55 is a layer of low-density elastomeric foam. The module support 52 is planar as shown in FIGS. 6A and 6B or, alternatively, shaped to mimic a portion of the human anatomy, tissue or organ.

Figure 7:
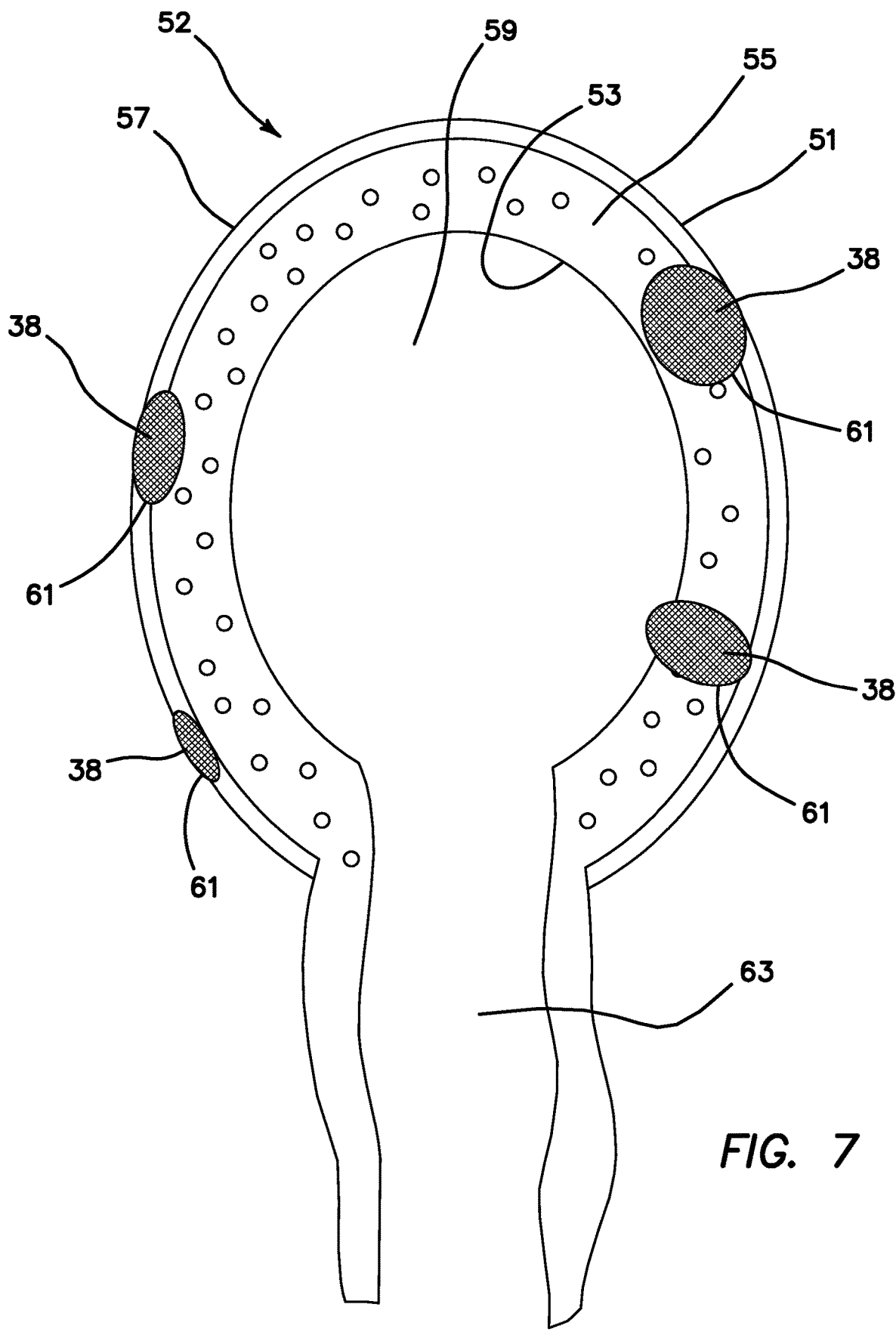
FIG. 7 illustrates a cross-sectional view of a simulated tissue structure configured to mimic a human uterus according to the present invention.

For example, FIG. 7 illustrates a support 52 that is shaped to mimic a human uterus. The support 52 includes a first layer 57 connected to a second layer 55. In one variation, the first layer 57 is made of any suitable polymeric material such as a sheet of elastomeric material and the second layer 55 is made of any suitable polymeric material such as low-density elastomeric foam. The second layer 55 serves as a support for the first layer 57 and advantageously permits the tumors 38 within the modules 50 or the tumors 38 by themselves to be connected to the support 52 and realistically extend deeply into the support 52 and be dispersed throughout the support 52 in various locations and orientations including being embedded into the first layer 57 as shown in FIG. 7. Tumor or module receiving portions 61 are formed in at least one of the first layer 57 and second layer 55. The tumor receiving portions 61 may be pockets that are pre-formed in the second layer 55 or can be formed by the user by cutting slits into the second layer 55. In one variation, the tumors 38 are configured to mimic fibroid tumors commonly found in the human uterus. Examples of fibroid tumors that are simulated by the tumors 38 disposed in the support include but are not limited to one or more of the following types of fibroids: pedunculated submucosal fibroids, subserosal fibroids, submucosal fibroids, pedunculated subserosal fibroids and intramural fibroids. The user can approach the support 52 to excise the simulated tumors 38 from the first surface 51 or the second surface 53 via the access channel or opening 63. In one variation, the opening 63 serves as the only opening to the hollow portion 59 or alternatively the support 52 can have a substantially C-shaped planar configuration with access available to the user from above or below the planar C-shaped structure.

In one variation, the module support 52 in any of the variations is not planar but is provided with a landscape that includes curves and other structures, mountains and valleys and various textures. The varying landscape provides the user with various levels of difficulty in approaching each tumor location requiring the user to navigate around artifacts and features that may obscure the tumor location. These structural artifacts in the tumor support 52 may be integrally formed with the tumor support 52 or also be modular in structure similar to the tumor modules 50 making the anatomy landscape modules removable and interchangeable. Tumor modules 50 are interchangeable with non-tumor modules that include, for example, features and artifacts or textures made of silicone or other material extending outwardly or inwardly from the one or more of the upper and lower surfaces 51, 53 of the module support 52. The features in such non-tumor modules can have various shapes to mimic anatomy that includes adjacent organ structures or tissues. For example, a non-tumor module can include a tubular form of silicone to mimic an intestine. The non-tumor and tumor modules 50 are removably connected to the module support 52 by any means known to one skilled in the art enabling the user to discard a module after use and then to continue practicing by replacing the discarded module or moving to an adjacent module 50 in the module support 52 or changing out a tumor module 50 for another tumor module 50 having a different feature or level of difficulty.

Figure 8:
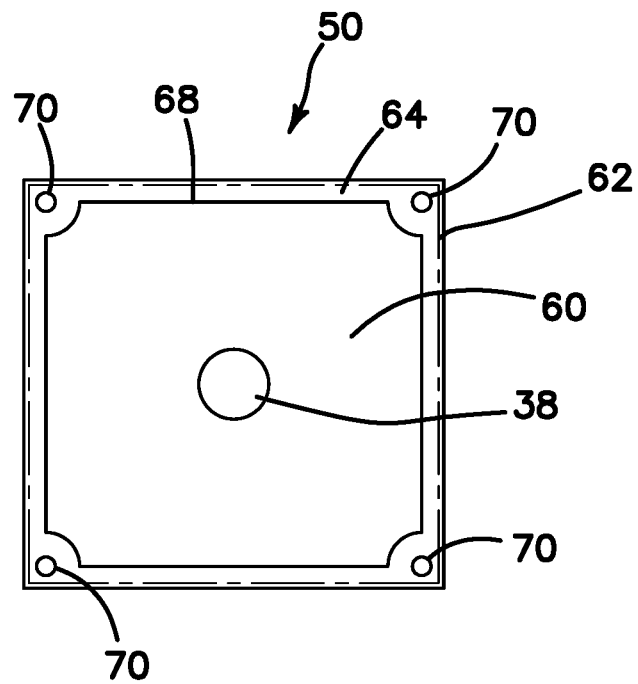
FIG. 8 illustrates a top view of a modular tissue structure according to the present invention.
Figure 9:
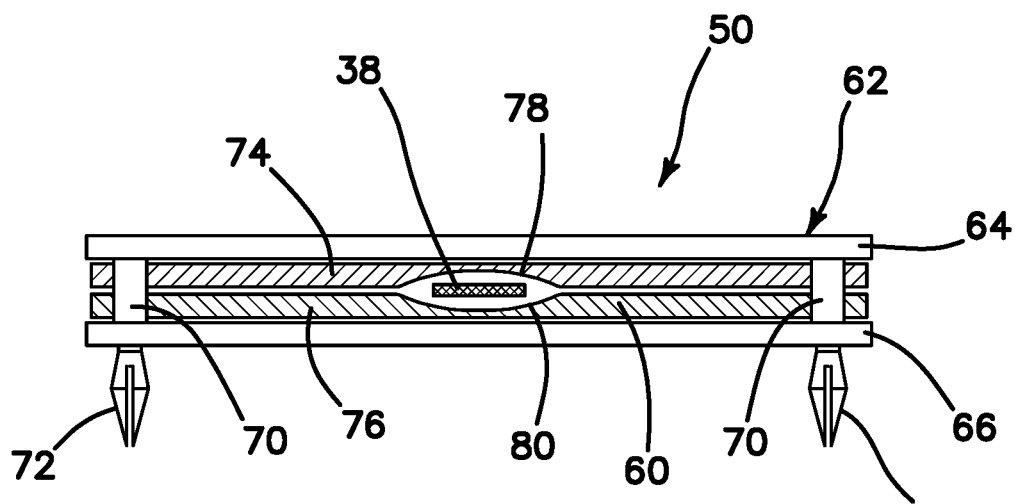
FIG. 9 illustrates a side view of a modular tissue structure according to the present invention.

A variation of the tumor module 50 is shown in FIGS. 8 and 9. The tumor module 50 includes a simulated tissue portion 60 connected to a support 62. In the variation shown, the support 62 includes a top frame 64 connected to a bottom frame 66. At least one of the top frame 64 and bottom frame 66 includes a window. The top frame 64 having a window 68 is shown in FIG. 8. The bottom frame 66 may or may not include a window. If windows are provided in both the top frame 64 and the bottom frame 66, the windows are aligned at least in part. The support 62 is sized and configured to receive a simulated tissue portion 60 between the top frame 64 and the bottom frame 66. The top frame 64 is connectable to the bottom frame 66 to capture the unitary simulated tissue portion 60 or a simulated tissue portion 60 formed from multiple layers and, in one variation, separable. In one variation, the frames 64, 66 are spaced apart from each other using spacers 70. Furthermore, at least one of the top and bottom frames 64, 66 includes one or more connecting features 72 configured to secure the tumor module 50 to a tumor support 52 (not shown). In FIG. 9, the connecting features 72 are shown as extending pegs for insertion into corresponding holes formed in the tumor support 52 to provide a snap-fit engagement. A friction fit or other fasteners or connecting means such as hook-and-loop type materials can be employed on the module 50 and module support 52 to connect the module 50 to the support 52 in a removable fashion.

Still referencing FIGS. 8 and 9, the simulated tissue portion 60 can be any of the constructs described above with reference to FIGS. 2-5. With windows formed in both the first and second frames 64, 66, the simulated tissue portion 60 can be approached from either side of the module 50. Any layer described above as a cover layer may act as a top layer or as a bottom layer depending on from which side or direction the simulated tissue portion 60 is approached. For example, a base layer may also serve as a top layer or as a bottom layer depending on which side or direction the simulated tissue portion 60 is approached. In such, bi-directional constructs, the thicknesses and colors of the layers may be adjusted accordingly to provide the desired simulated effect.

The simulated tissue portion 60 in FIG. 9 includes a first layer 74 and a second layer 76. The first and second layers 74, 76 are made from a polymeric material configured to mimic real live tissue such as silicone or other polymer and can include dye of any one or more appropriate colors or mesh, fabric, or other reinforcement. Each of the layers 74, 76 includes a tumor receiving portion 78, 80, respectively. Each tumor receiving portion 78, 80 is a concavity, indent, half-pocket or a location of reduced layer thickness that is formed in the layers 74, 76. The tumor receiving portions 78, 80 are substantially aligned to form a pocket for the tumor 38. Although each layer 74, 76 in FIG. 9 is shown with a tumor receiving portion 78, 80, a single tumor receiving portion is formed in at least one of the first and second layers 74, 76 in one variation. A tumor 38 is disposed within the pocket formed by one or more tumor receiving portions 78, 80 formed in the one or more layers 74, 76. The tumor 38 may be adhered to either layer 74, 76 or free floating inside the pocket. As shown in FIG. 9, the tumor receiving portion formed in a layer can be considered to be one type of defect and the variation of FIG. 9 describes a simulated tissue construct comprising two defect layers with a tumor therebetween. As a user approaches the simulated tissue portion 60, the user will see the target tumor location. Visualization of the target tumor 38 is enhanced by the tumor receiving portion being thinner in thickness relative to the rest of the layer with the thinning of the layer being provided by the concavity or pocket. The user will then cut in the general location of the tumor cutting into at least one of the layers 74, 76 to remove the tumor 38. Cutting through one or more layers completes the creation of a gap or full defect which the user can then practice suturing or otherwise closing together. In another variation, there is no tumor receiving portion formed in the layers 74, 76. In such a variation, at least one tumor is disposed between the two layers 74, 76 wherein the layers 74, 76 have a substantially uniform thickness with the tumor 38 creating a minor bulge in the layers.

Figure 10A:
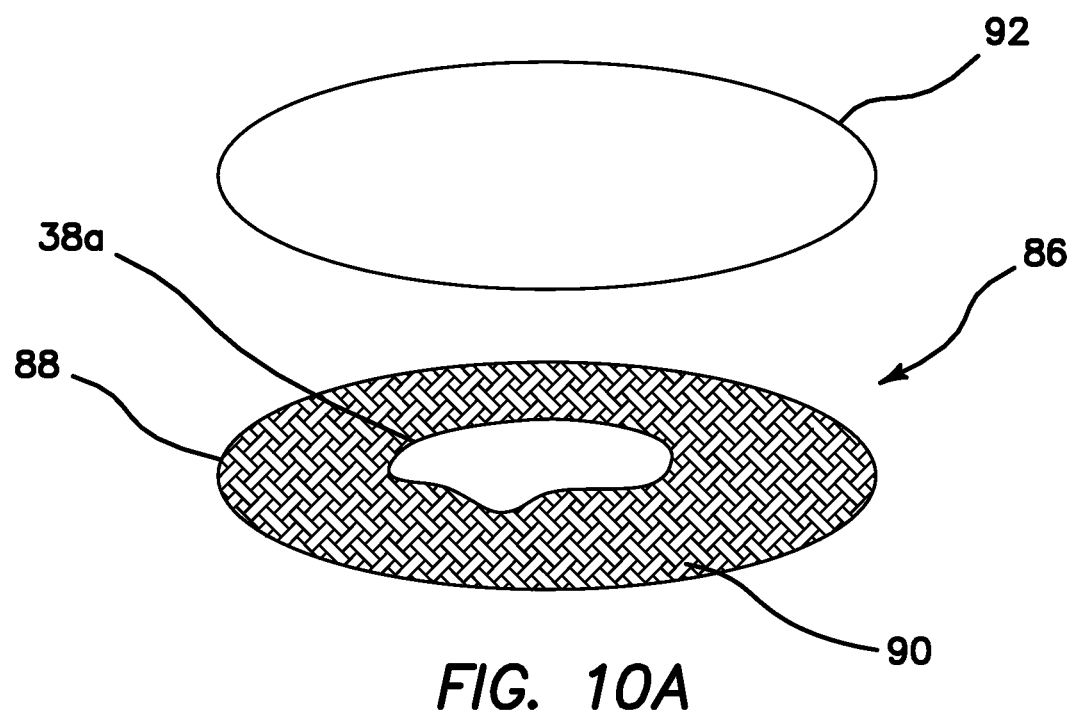
FIG. 10A illustrates a perspective view of a simulated tissue structure according to the present invention.
Figure 10B:
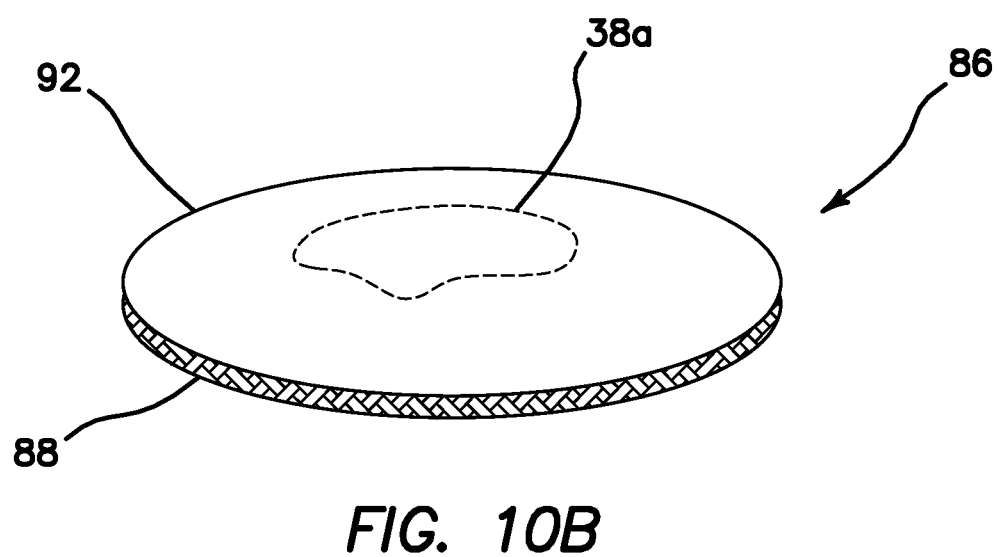
FIG. 10B illustrates a perspective view of a simulated tissue structure according to the present invention.
Figure 11A:
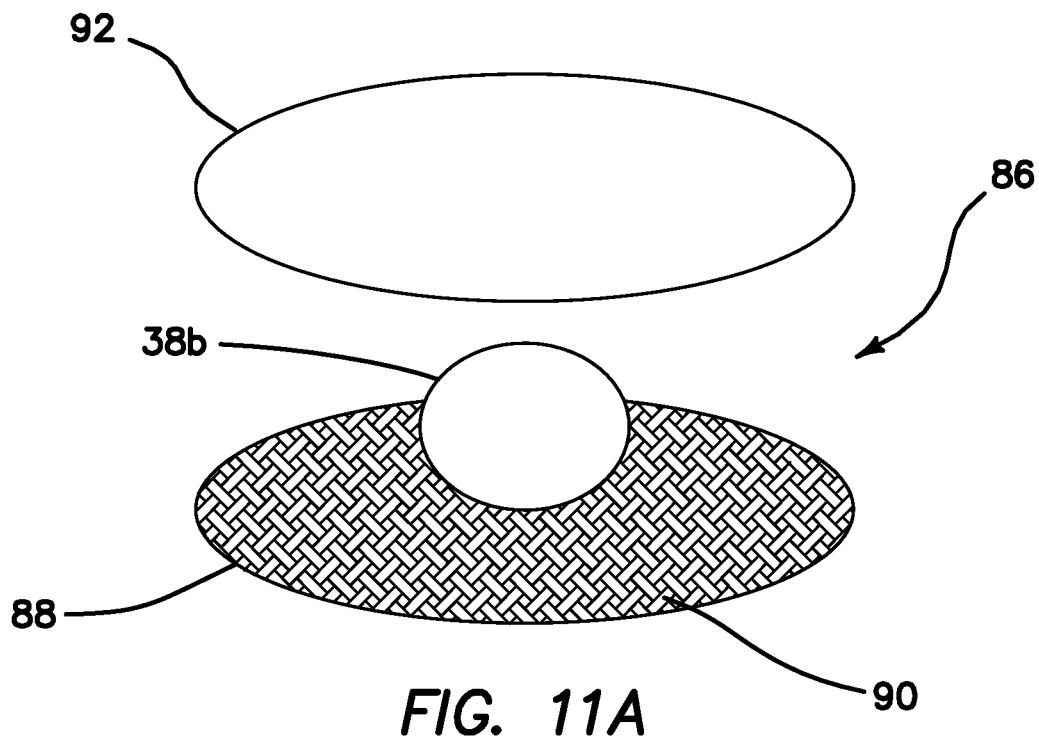
FIG. 11A illustrates a perspective view of a simulated tissue structure according to the present invention.
Figure 11B:
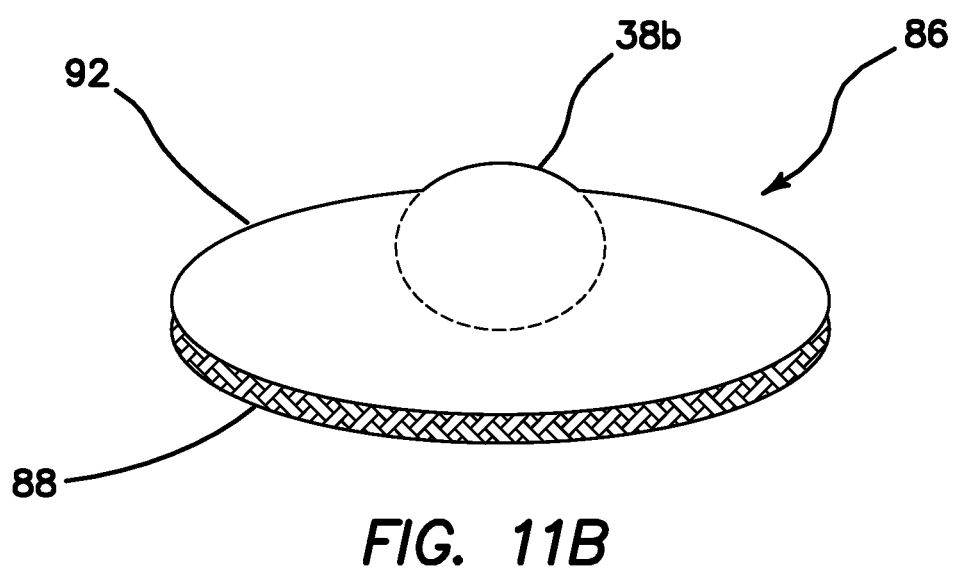
FIG. 11B illustrates a perspective view of a simulated tissue structure according to the present invention.
Figure 12:
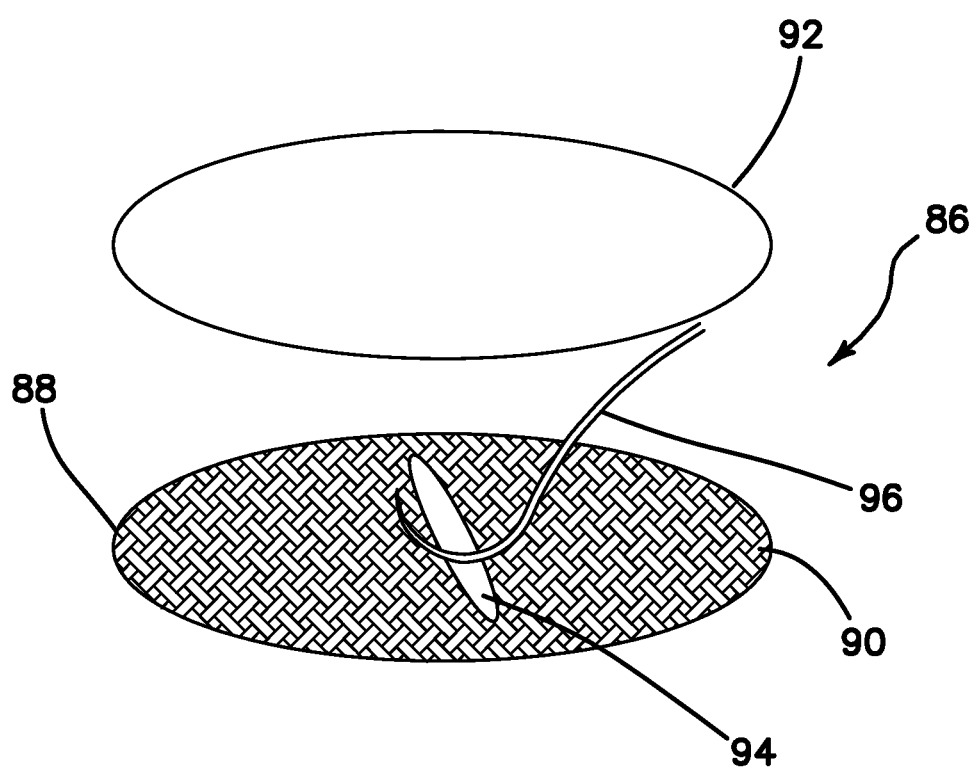
FIG. 12 illustrates a perspective view of a suture needle and a simulated tissue structure according to the present invention.

Turning now to FIGS. 10A, 10B, 11A, 11B and 12, there is shown another variation of a simulated tissue portion 86. The tissue portion 86 can be integral or modular as described above. The tissue portion 86 includes a base layer 88 formed of any suitable polymeric material such as silicone or other elastomeric polymer that may or may not include a reinforcement material such as fabric, mesh, nylon or other reinforcement material or filler that will resist tearing while carrying sutures or while being sutured. The base layer 88 is connected to a defect layer 90 that is overlaid onto the base layer 88. The defect layer 90 includes a plurality of protrusions extending upwardly from the base layer 88. The defect layer 90 may be integrally formed with the base layer 88 or be a separate layer that is adhered to the base layer 88. As can be seen in FIGS. 10A, 11A and 12, the defect layer 90 is configured into a lattice shaped pattern such that the lattice is raised above the base layer 88 or projects upwardly from the base layer 88. A lattice pattern is exemplary and any shape may be formed by the defect layer 90 such that it contains a plurality of adjacent projections. These projections of the base layer 90 provide the user with locations to hook a suture needle into and as a platform to raise the tumor 38a, 38b above the base layer 88 for easy excision. The tumors 38a, 38b may be adhered to the defect layer 90 and a cover layer 92 may be included in one variation. FIGS. 10A and 11A show the base layer 88, defect layer 90, tumors 38a, 38b and a cover layer 92 in a semi-exploded view of the simulated tissue portion 86 wherein the cover layer 92 is raised above the other layers. The tumor 38a of FIG. 10a is substantially planar and is shown covered in FIG. 10B by the cover layer 92. Tumor 38b of FIG. 11A has greater height and is substantially spherical in shape and FIG. 11B shows the spherical tumor 38b covered with the cover layer 92 leaving a raised portion or protuberance in the construct. FIG. 12 shows the tumor 38 being removed leaving a remnant defect 94 in the base layer 88 and a suture needle crossing the gap in the defect 94 with the defect having been accessed under or through the cover layer 92.

Figure 13A:
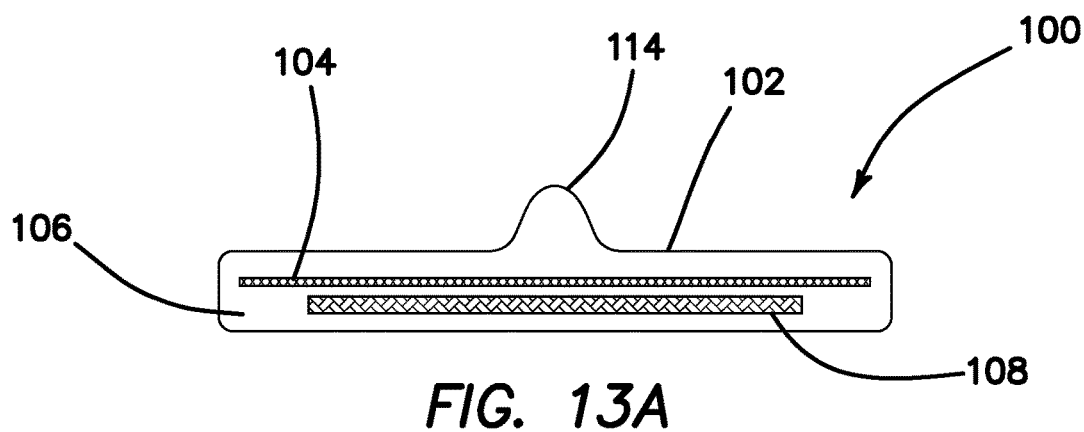
FIG. 13A illustrates a transparent side view of a polyp simulation according to the present invention.

Turning now to FIG. 13A, there is shown a polyp simulation 100 according to the present invention. The polyp simulation 100 includes a defect layer 102, a mesh layer 104, a muscle layer 106 and a mold release 108.

Figure 13B:
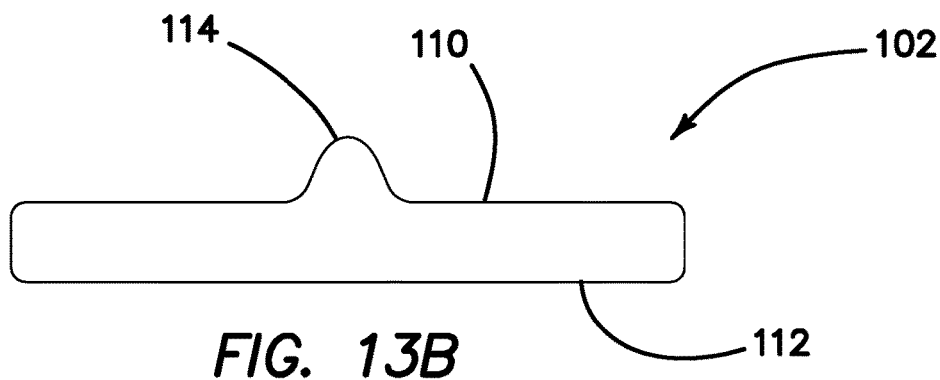
FIG. 13B illustrates a side elevational view of a defect layer of a polyp simulation according to the present invention.

Turning now to FIG. 13B, the defect layer 102 includes a first surface 110 opposite from a second surface 112. The defect layer 102 is a substantially planar and thin layer of silicone material in the x-y plane. The defect layer 102 includes a defect 114 extending outwardly from the first surface 110 along a z-axis in a direction perpendicular to the x-y plane. The defect 114 may be any shape. In one variation, the defect 114 mimics an abnormal tissue growth such as a polyp. In one variation, the defect 114 includes a narrow elongated stalk and a bulbous distal end. In another variation, the distal end of the defect is curved. In another variation, the defect 114 mimics a colorectal polyp or colon polyp. In one variation, the defect 114 is approximately 2-5 millimeters in length and 1-5 millimeters in width. In one variation, the silicone of the defect layer 102 is dyed red or pink. In one variation, the defect layer includes an inclusion of contrast colored silicone.

Figure 13C:
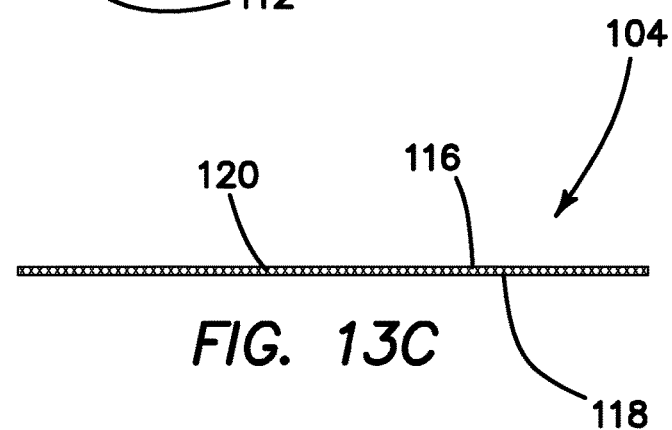
FIG. 13C illustrates a side elevational view of a mesh layer of a polyp simulation according to the present invention.

Turning now to FIG. 13C, the mesh layer 104 includes a first surface 116 opposite from a second surface 118. The mesh layer 104 is a substantially planar and thin layer comprising strands 120 of fibers made of nylon or other polymer in the x-y plane. In one variation, the mesh layer 104 is made of LYCRA. In one variation, the mesh layer 104 is capable of being stretched in any direction. In another variation, the mesh layer has bi-directional stretch properties. The strands of polymer fiber form a web or net. The mesh layer 104 may be woven and have a uniform pattern. The mesh layer 104 is pink, clear or white in color.

Figure 13D:
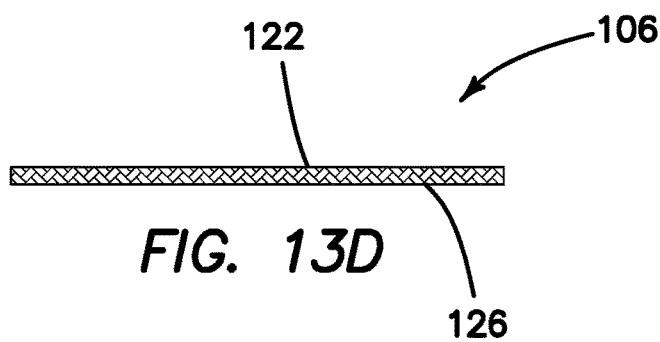
FIG. 13D illustrates a side elevational view of a muscle layer of a polyp simulation according to the present invention.

Turning now to FIG. 13D, the muscle layer 106 includes a first surface 122 opposite from a second surface 124. The muscle layer 106 is a substantially planar and thin layer of silicone material in the x-y plane. In one variation, the muscle layer is yellow in color.

The mold release 108 is a mold release agent that is typically in liquid form and sprayed on to form a mold release area or layer. The mold release agent is one that is suitable for use on silicone. In one variation, the mold release layer 108 is a mold release agent alternative or substitute. The mold release layer 108 prevents at least a portion of a silicone layer surface from bonding to an adjacent silicone surface. In one variation, the mold release 108 prevents a portion of the defect layer 102 from bonding to the adjacent muscle layer 106. In another variation, the mold release 108 prevents at least a portion of the defect layer 102 and mesh layer 104 combination from bonding to the adjacent muscle layer 106.

Figure 14A:
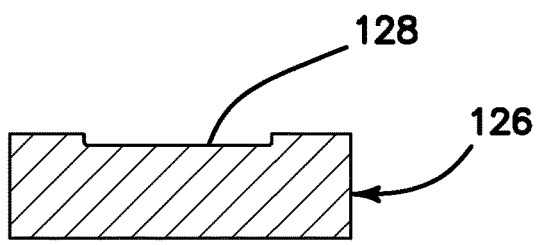
FIG. 14A illustrates a side elevational view of a mold for a muscle layer according to the present invention.
Figure 14B:
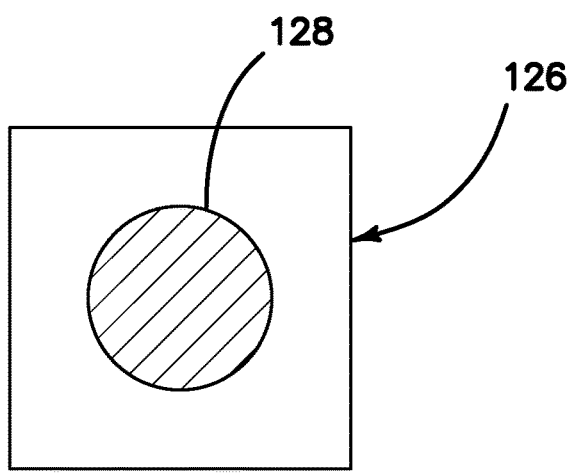
FIG. 14B illustrates a top view of a mold for a muscle layer according to the present invention.

Turning now to FIGS. 14A-14B, there is shown a muscle mold 126 for molding the muscle layer 106. The muscle mold 126 includes a first well 128. The well 128 is circular in shape to produce a circular muscle layer 106. The first well 128 may be any shape. Uncured silicone is poured into the mold and allowed to cure to form the muscle layer. Mold release may be employed to help remove the cured layer. The removed layer may be washed with alcohol to remove any mold release.

Figure 15A:
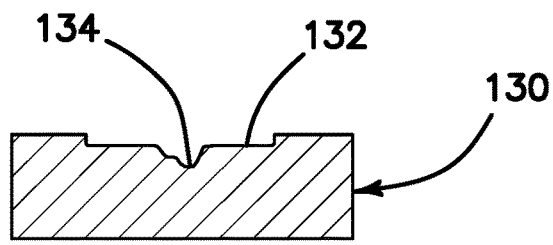
FIG. 15A illustrates a side elevational view of a mold for a defect layer according to the present invention.
Figure 15B:
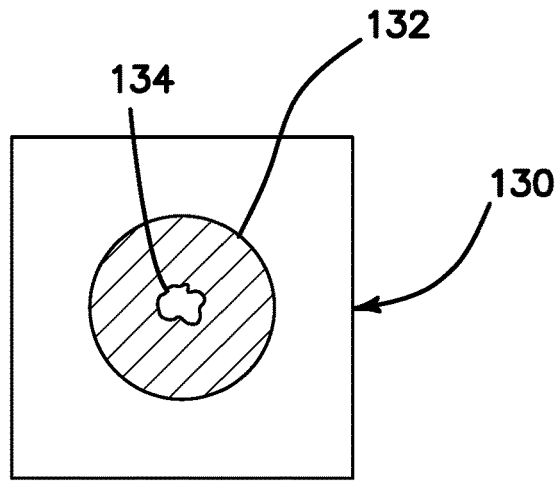
FIG. 15B illustrates a top view of a mold for a defect layer according to the present invention.

Turning now to FIGS. 15A-15B, there is shown a defect mold 130 for molding the defect layer 102. The defect mold 130 includes a first well 132 having a first depth and a second well 134 having a second depth. The second depth is greater than the first depth. The second well 134 is located within the first well 132. The second well 134 is for forming the shape of a polyp or other defect 114. The shape of the second well 134 corresponds to the shape of the defect 114. The shape of the first well 132 is circular to form a circular defect layer although it may have any shape. In one variation, the size and shape of the first well 132 is the same size and shape as the first well 128 of the muscle mold 126 to create muscle layers 106 and defect layers 102 that have the same size and shape and can be easily aligned and connected to form a nice patch-like simulation 100. The second well 134 is formed such that it is within the perimeter of the first well 132. The second well 134 produces a defect 114 that is surrounded by the remaining of the defect layer 102. Uncured silicone is poured into the defect mold 130 and allowed to cure before being removed. Mold release may be employed to facilitate removal of the defect layer 102 from the defect mold 130. In another variation, contrast-colored, cured silicone pieces are placed into the second well 134 that forms the shape of the polyp or other defect. For example, one or more red colored, cylindrically shaped cured silicone pieces sized to fit inside the second well 134 are disposed into the second well 134 prior to pouring the uncured silicone into the defect mold or after the uncured silicone is poured into the defect mold 130 to form the defect layer 102. The result is that the contrast colored silicone pieces will be embedded inside the defect layer 102 in the location of the defect to provide a custom and more realistic construction of a particular defect that is being simulated.

In one variation, the defect layer 102 is connected to the mesh layer 104 such that the second surface 112 of the defect layer 102 faces the first surface 116 of the mesh layer 104. In one variation, adhesive may be employed between the defect layer 102 and the mesh layer 104 or, in another variation, the mesh layer 104 is placed into the defect layer 102 while the silicone of the defect layer 102 has not been cured. As a result, the mesh layer 104 is embedded within the defect layer 102. If the mesh layer 104 is embedded within the defect layer 102, the resulting combination has a proximal surface which is the first surface 110 of the defect layer 102 and a distal surface which is the surface close to the mesh layer 104. Mold release 108 is applied to the distal surface of the defect/mesh layer combination in a selective area. In one variation, the mold release 108 is applied in the center of the perimeter such that an annular area without mold release 108 surrounds the area where mold release is applied. In another variation, mold release 108 is applied under the defect 114 such that an area of the distal surface that does not have mold release surrounds the area with mold release 108 on it. The area that surrounds the mold release area does not have mold release 108 on it so as to create a bond between the muscle layer 106 and the defect layer 102 that is annular in shape. The area with mold release 108 on it will not bond the muscle layer 106 to the defect layer 102 making them separable in the location of the defect 114. Next, the muscle layer 106 is connected to the distal surface of the defect/mesh layer combination. The muscle layer 106 is connected with adhesive in one variation. In another variation, the muscle layer 106 is applied to the distal surface of the defect/mesh layer combination while the silicone of the defect layer 102 is still uncured so as to embed the muscle layer 106 into the defect/mesh combination.

Figure 16:
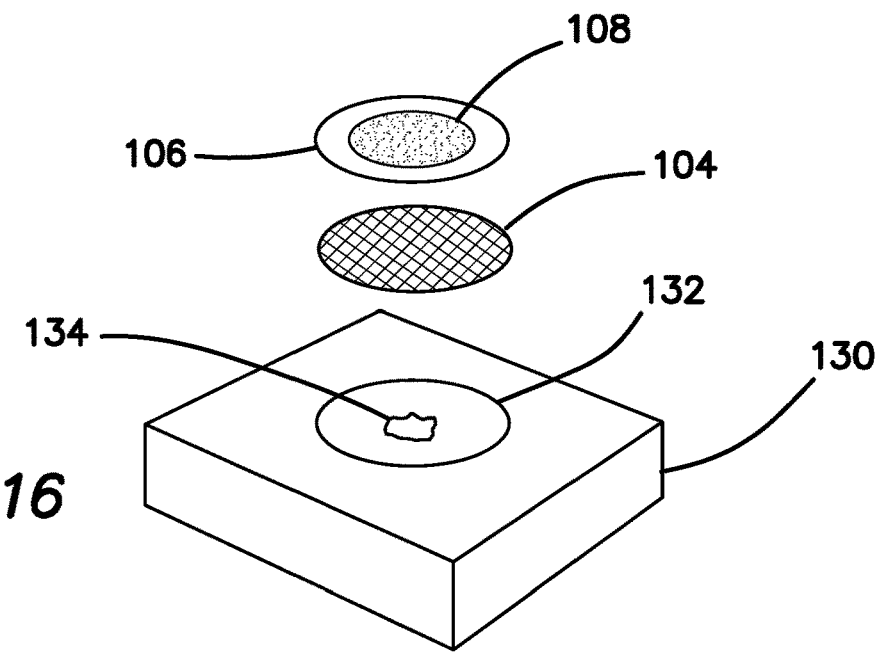
FIG. 16 illustrates an exploded view of a defect mold, defect layer, mesh layer, mold release layer and muscle layer according to the present invention.

In another method of forming the polyp simulation 100, the forming process involves two molds, the muscle mold 126 and the defect mold 130. Silicone is cast in the muscle mold 126 to form the muscle layer 106. The silicone of the muscle layer 106 is allowed to cure. The muscle layer 106 is then removed from the muscle mold 126. The muscle layer 106 is cleaned using isopropyl alcohol. Mold release 108 is applied only to the center of the muscle layer 106 or underneath the defect 114. The mold release 108 is applied to the first surface 122 using a stencil. The muscle layer 106 with the mold release 108 is set aside. With reference to FIG. 16, silicone is cast in the defect mold 130 to form the defect layer 102. While the silicon in the defect mold 130 is un-cured, the mesh layer 104, having a shape that conforms to the shape of the first well 132, is placed onto the un-cured silicone in the defect mold 130 such that it becomes connected thereto. The muscle layer 106 with the mold release 108 is placed above the mesh layer 104 such that the first surface 122 having the mold release 108 applied to it faces the mesh layer 104 and the defect layer 102. The muscle layer 106 with the mold release 108 is placed face down towards and onto the mesh layer 104 and the uncured silicone of the defect layer 102. The muscle layer 106 is pressed into the defect layer 102 while it is un-cured with gloved fingers, for example, to remove any air bubbles. The silicone of the defect layer 102 is allowed to cure and the resulting polyp simulation 100 is removed from the defect mold 130. All of the layers have the same shape and are overlaid each other in an aligned fashion to form a single piece polyp simulation 100. As a result of the mold release 108, part of the muscle layer 106 is not adhered to the defect and mesh layers 102, 104 and a part of the muscle layer 106 without mold release 108 on it is adhered to the defect and mesh layers 102, 104. The selective adherence advantageously creates a polyp simulation 100 suitable for practicing polyp removal and the mesh layer creates a polyp simulation suitable for practicing suturing after the polyp has been removed.

In another method, the defect layer 102 is allowed to cure with or without a mesh layer 104. The second layer 106 is allowed to cure. A stencil is laid on top of one of the defect layer 102 and second layer 106. The stencil has one or more apertures. The one or more apertures are arranged on the stencil in a pattern configured for adhesion. One pattern comprises a plurality of randomly spaced dots or circles. Uncured silicone or adhesive is applied onto the stencil in the location of the apertures such that the uncured silicone or adhesive passes through the one or more aperture and comes into contact with the layer on which the stencil is laid. The stencil is removed along with excess adhesive or uncured silicone leaving behind a pattern of uncured silicone or adhesive. The other one of the defect layer and second layer 106 is then laid on top of the other layer and adhered thereto. The pattern for adhesive on the stencil can be a circumferential pattern or circular pattern in the location of the defect or any other pattern. The stencil aperture may be a single continuous or multi-aperture pattern of a plurality of circles, for example, that forms a larger circle along the perimeter of the layers and/or around the defect such that the two layers are not adhered outside the applied adhesive or applied uncured silicone. Mold release may or may not be employed between the two adhered layers.

One or more resulting polyp simulation 100 is then adhered to another portion of a simulated tissue structure. For example, the patch-like polyp simulation 100 is adhered with adhesive to the inside surface of a tubular simulated colon, that in one variation, is made of silicone. The poly simulation 100 is connected to the simulated colon model such that the defect 114 extends into the lumen of the colon.

In another variation, the muscle layer 106 and the defect layer 102 are bonded together without an additional mesh layer 104 for ease of manufacturing. In another variation, the muscle layer 106 and the defect layer 102 are separately fully cured and adhered together without any mold release 108. In another variation, the defect 114 is not formed as an integral protrusion extending from the first surface 110 of the defect layer 102. Instead, the defect 114 is a separate piece that is located between the muscle layer 106 and the defect layer 102. In another variation, the defect 114 is not formed as an integral protrusion extending from the first surface 110 of the defect layer 102. Instead, the defect 114 is a separate piece that is located between the muscle layer 106 and the defect layer 102 such that the defect 114 floats between the two layers 102, 106.

The polyp simulation 100 is used with a simulated rectum. The simulation 100 advantageously includes a mesh layer 104 embedded in it which allows the user to practice suturing techniques following the practiced removal of the defect 114. The present simulation 100 increases the difficulty of removing the defect because the layers 106, 102 are not as easily separated due to the annular area that does not have mold release 108. The mesh layer 104 allows the polyp simulation 100 to be sutured. The suturing techniques are practiced by the user without damaging the surrounding silicone. Connecting the two muscle layer 106 while the defect layer 102 is still uncured results in a construct that increases the difficulty of separating the two layers and increases the accuracy of the simulation. The embedded mesh layer 104 stops the suture from tearing, ripping or cutting through the silicone. Furthermore, it is more challenging to separate the muscle layer 106 from the defect layer 102 as a weak vacuum is created between the two layers 102, 106 in the location having the mold release 108. The vacuum leaves the muscle layer 106 and the defect/mesh layer in close proximity to each other almost mimicking adherence. This vacuum may be released by pulling the layers apart with surgical instruments creating a space between the two layers 102, 106 allowing the user to practice this technique. This makes separation easier depending on the application and/or anatomy relative to a variation that would not have any mold release between the two layers resulting in the muscle and defect layers being bonded along the entirety of their interfacing surfaces.

Figure 17A:
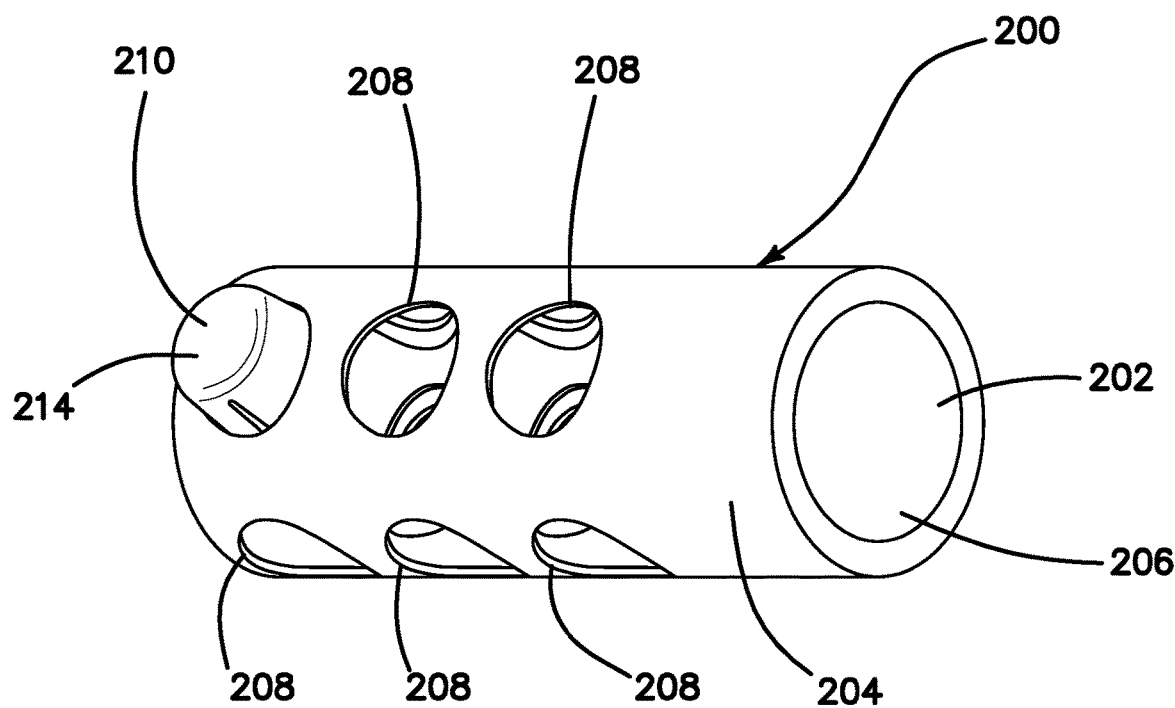
FIG. 17A illustrates a tissue simulation model having pods with attached simulated tissue portions according to the present invention.
Figure 17B:
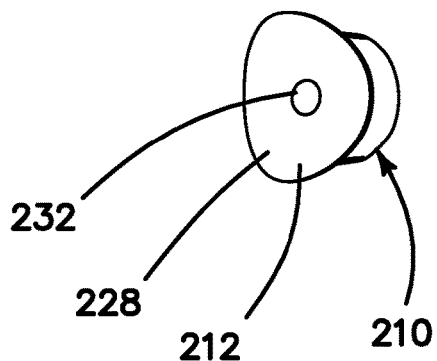
FIG. 17B illustrates a pod assembly according to the present invention.
Figure 17C:
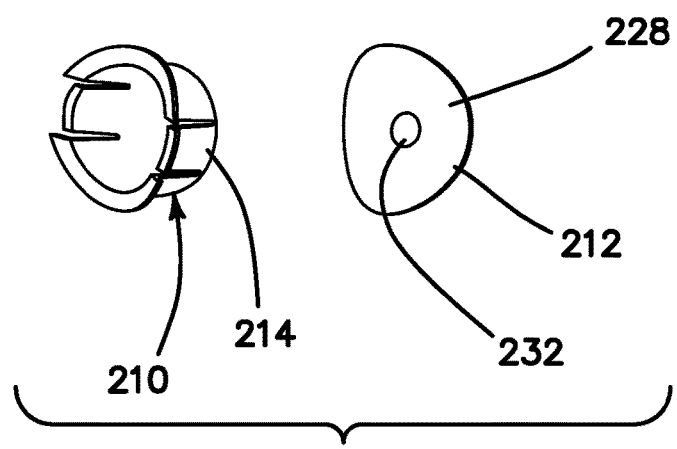
FIG. 17C illustrates an exploded view of a pod assembly according to the present invention.

Turning now to FIGS. 17A-17C, there is shown a simulated tissue model 200 for practicing surgical procedures. The model 200 shown in FIG. 17 is configured to mimic a portion of a colon or bowel section; however, the invention is not limited to a colon or bowel. The entire model 200 may be configured to mimic at least a portion of any organ or tissue section upon which the practice of certain surgical procedures is desired. The simulated tissue model 200 comprises an inner surface 202 and an outer surface 204 that together define a sidewall having a thickness. The simulated tissue model 200 of FIG. 17A has a shape of a cylinder having a central lumen 206 extending along a longitudinal axis between an opening at the proximal end and an opening at the distal end to approximate a colon, rectum or bowel section. One of the openings at the ends may be omitted. Either one or more of the inner surface 202 and the outer surface 204 may include surface features or textures that mimic real tissue. For example, transverse folds and/or a mesorectum layer may be included. Simulated transverse folds may be an obstacle to the movement of the surgeon's instrument and/or obscure direct visualization of a lesion. Therefore, the presence of transverse folds replicates the challenges that a surgeon may face while performing a transanal procedure. A simplified model 200 will omit the transverse folds. A simulated mesorectum layer that is included with the model 200 advantageously provides a reference plane for approaching target tissue lesions that are located closer to the anal verge which are more difficult to remove due to limited instrument movement and the sharp approach angle.

The sidewall separates an interior space defined by the central lumen 206 of the simulated tissue model 200 from an exterior space of the model 200. The model 200 includes one or more apertures 208 extending through the sidewall from the inner surface 202 to the outer surface 204. Each aperture 208 is shaped and configured to receive a module or pod 210. The sidewall has a substantially uniform thickness in the area surrounding the pod-receiving apertures 208. A plurality of apertures 208 are formed along the length of the model 200 from the proximal end to the distal end and around the entire sidewall in various locations. The sidewall of the model 200 is made of a rigid or semi-rigid material such as plastic. In another variation, the sidewall of the model 200 is soft and/or combined with soft and semi-rigid or rigid portions. The sidewall of the model 200 is constructed to allow the pods 210 to be attached to the model 200.

Figure 18:
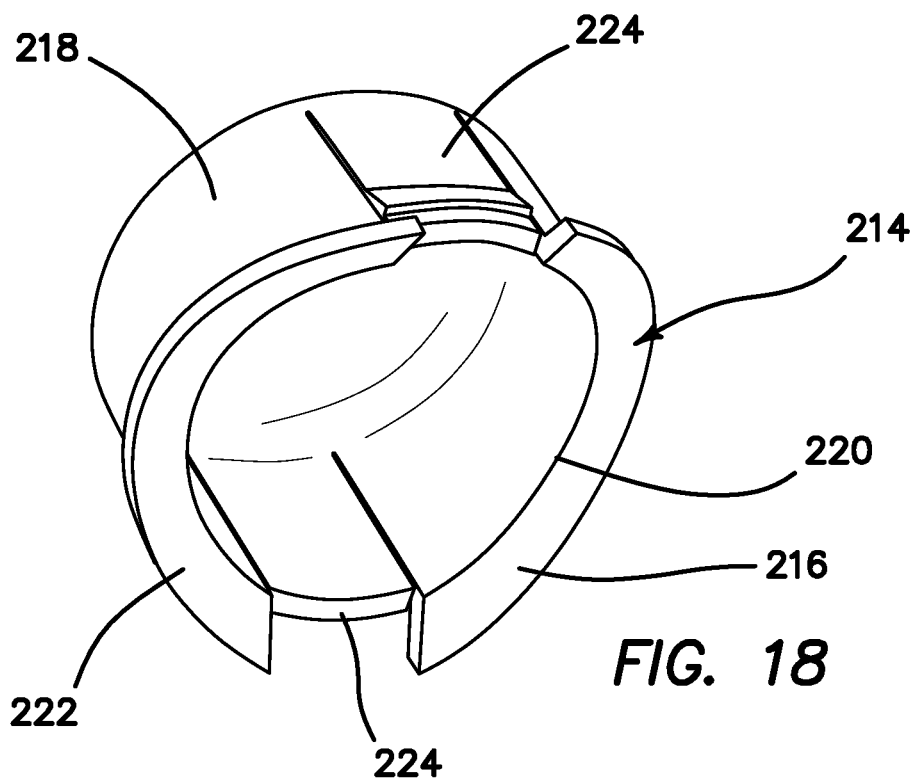
FIG. 18 is a bottom perspective view of a pod frame without a tissue portion according to the present invention.
Figure 19:
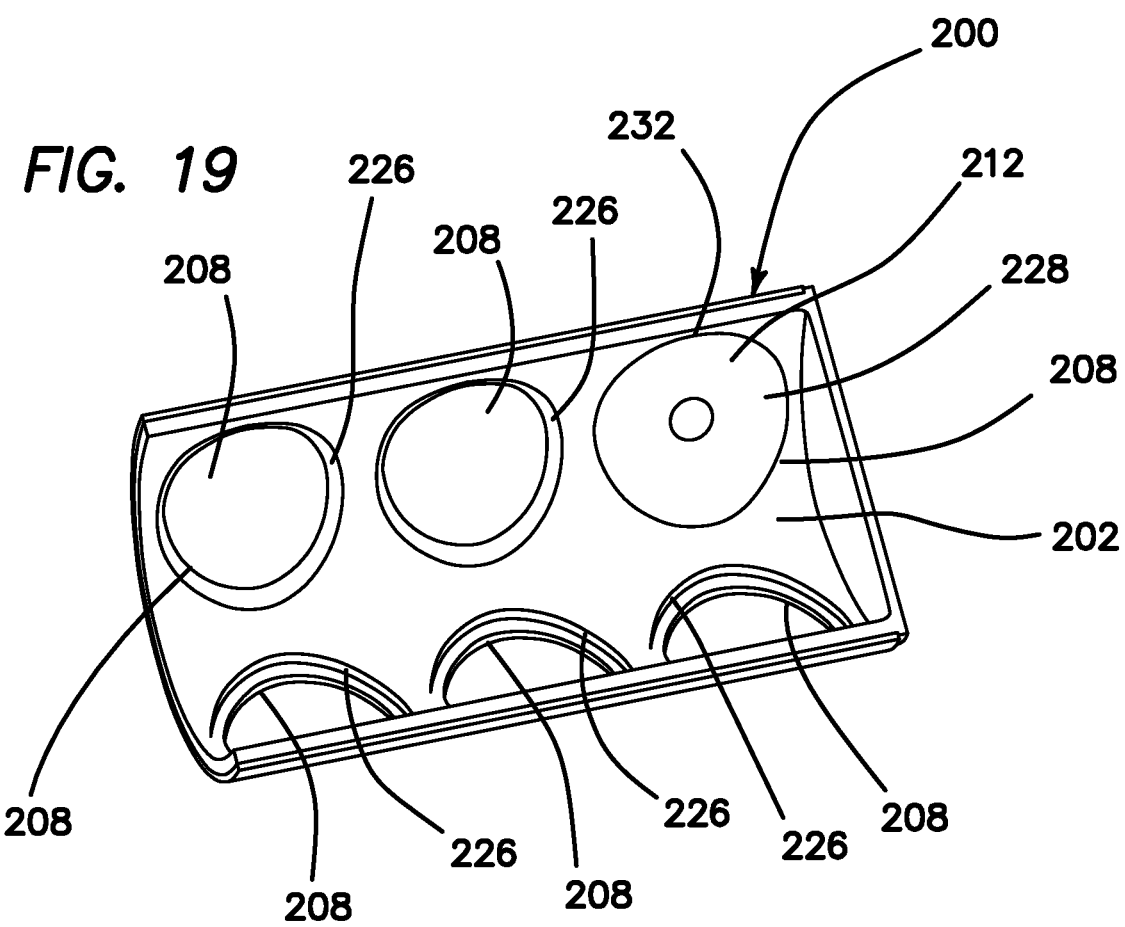
FIG. 19 is a top perspective cross-sectional view of a tissue simulation module according to the present invention.

Each pod 210 includes a simulated tissue portion 212 that is connected to a tissue carrier 214 also called a cap. A tissue carrier 214 is shown in FIG. 18. The carrier 214 includes a flange 216 that is connected to a frame 218. In one variation, the frame 218 is substantially cylindrical in shape and has an opening 220 at the proximal end and a closed distal end. The flange 216 is located at the proximal end and surrounds at least in part the opening 220. The frame 218 defines a substantially circular proximal opening 220 and the flange 216 extends at least along part of the perimeter of the opening 220. The flange 216 is substantially perpendicular to the cylindrical sidewall of the frame 218 and extends radially outwardly at the proximal end. The flange 216 includes a surface 222 configured to connect to and suspend the tissue portion 212. The pod 210 is configured to serve as a tissue insert that fills the apertures 208 and the flange surface 222 is contoured to match the portion of the inner surface 202 in which it is received. For example, if the inner surface 202 of the model 200 is concave, the surface 222 of the flange 216 will also be correspondingly concave in shape. The frame 218 includes oppositely disposed detents 224 configured to flex inwardly and then spring back outwardly for connecting and disconnecting the pod 210 to and from the model 200. Fingers of a user are employed to press the detents 224 inwardly while inserting the pod 210 into an aperture 208 of the model 200. The pods 210 may be inserted from the interior space of the model such that the sidewall of the model 200 ramps over the detents 224 flexing them inwardly and allowing them to snap back outwardly after the detents 224 have cleared the sidewall to capture the sidewall of the model 200 between the detent 224 and the flange 214, and thereby, connect the pod 214 to the model 200. The inner surface 202 of the model 200 includes a recess 226 that encompasses each aperture 208 as shown in FIG. 19. Each recess 226 extends around the apertures 208 and are sized and configured to receive the flange 216 of the pod 210 such that a connected tissue portion 212 or flange 216 is substantially even or flush with the inner surface 202 of the model 200. A pod 210 having a tissue portion 212 connected to it is shown inserted into an aperture 208 of the model 200 in FIGS. 17A and 19. The tissue portion 212 is connected to the flange 216 of the pod 210. In particular, the tissue portion 212 is connected to the surface 222 of the flange 216 by adhesive or bonding such that at least a portion of the tissue portion 212 is suspended or spans across the proximal opening 220. The tissue portion 212 that is suspended is free to flex and stretch within the pod 210 and be dissected in a simulation procedure. Following the procedure, the pod 210 may be removed from the model 200, discarded and replaced with a new pod 210 into the cylindrical sidewall of the model 200 for subsequent training and practice of surgical procedures. Each pod 210 with the tissue portion 212 is configured for attachment to a simulated model 200 having a tubular shape. The tubular shape can be configured to open as a clam to insert and remove the pods 210.

The tissue portion 212 of each pod 210 is flexible and includes at least a planar first layer 228. The first layer 228 includes a first side and a second side. The first layer 228 is connected to the flange surface 222 such that the first side faces the interior of the model 200. The first layer 228 is sized and configured to overlay the opening 220 and attach to the flange 216. As such, the connected first layer 228 covers the opening 220. The central portion of the first layer 228 is free to flex in response to impingement by surgical instruments. The first layer 228 is also configured to be severed with a blade such as a scalpel or other instrument and to be grasped by a surgical instrument or otherwise manipulated as needed by the surgeon practicing a surgical procedure. The central portion of the first layer 228 is suspended in trampoline-like fashion. The first layer 228 is made of silicone and may or may not include a mesh layer, fiber, fabric or other reinforcement material that would impart the first layer 228 with suturable qualities permitting the first layer 228 to hold sutures without being torn. In another variation, the first layer 228 is made of KRATON®.

In another variation, the tissue portion 212 includes a substantially planar first layer 228 and a simulated target or tumor 232 connected to the first layer 228. The first layer 228 is connected to the frame 218 such that the first side faces the interior of the model 200. The simulated tumor 232 is connected to the first side of the first layer 228 such that the simulated tumor 232 faces the interior of the model 200 and in one variation protrudes toward the longitudinal axis. In this variation, both the first layer 228 and the simulated tumor 232 are made of silicone. The first layer 228 is generally dyed to have the same color as the surrounding color of the inner surface 202 of the model 200 so that it is indistinguishable from the surrounding inner surface 202. The first layer 228 is generally pink or red in color. The simulated tumor 232 can be dyed a color, such as dark red, brown or black, that is darker or in contrast to the first layer 228. The simulated tumor 232 extends outwardly from the first surface of the first layer 228. In another variation, the polyp simulation 100 of FIGS. 13-16 is attached to the pod 210.

In another variation, the tissue portion 212 includes a substantially planar first layer 228 having a first side and a second side, a planar second layer 230 having a first side and a second side and a simulated target or tumor 232. The first layer 228 is substantially planar and connected to the frame 218 such that the first side faces the interior of the model 200. The first layer 228 is made of silicone and dyed a pink or red color. The second layer 230 is substantially planar and includes a first side and a second side. The second layer 230 is connected to the first layer 228 such that the first side of the second layer 230 faces the second side of the first layer 228. In one variation, adhesive is used on least a portion of the first or second layer to connect the two layers together. In another variation, one of the layers 228, 230 is applied to the other layer while in an uncured state and allowed to cure and adhere to the other layer resulting in the layers being more easily separated relative to using adhesive. The second layer 230 is made of silicone and is dyed a yellow color. The simulated tumor 232 is attached or integrally formed with the first layer 228 such that the simulated tumor 232 is connected to the first side of the first layer 228 or extends outwardly from the first side of the first layer 228. The second layer 230 is yellow in color and simulates the submucosa layer. The first layer 228 is pink and simulates the rectum wall. The simulated tumor 232 simulates a tumor, lesion or other surgically desirable target. In one variation, the second layer 230 has a planar configuration with an outer surface and an inner surface and sized to be the same size and shape as the first layer 228; and the tumor 232 is sized smaller than the first and second layers 228, 230. The surgeon in practicing a transanal approach will insert surgical instruments into an opening at one or more of the proximal end or distal end of the model 200. The surgeon will practice using a scalpel to make an incision into the first layer 228, extend the incision through the first layer 228 and around the simulated tumor 232. The second layer 230 provides an indication or warning to the surgeon to stop cutting and to not cut into the second layer 230. Therefore, the surgeon can practice careful and precise excision of a simulated tumor 232. Therefore, upon visualization, yellow second layer 230 serves as a reference plane for the surgeon. In one variation, to facilitate the excision of the tumor 232 and at least a portion of the first layer 228, the area of the first layer 228 that is adjacent to or beneath the simulated tumor 232 is not adhered to the second layer 230 with adhesive. In one variation, the first layer 228 is adhered to the second layer 230 only circumferentially around the simulated tumor 232 making the first layer 228 easily separable from the second layer 230 if the cut is made within the perimeter of adhesion. This type of placement of adhesive advantageously help guide the surgeon to making a more precise excision. In another variation, the area of the first layer 228 under the simulated tumor 232 is adhered to the second layer 230 without adhesive by way of surface adhesion properties of like materials or by curing one layer onto the other layer in the fabrication of the tissue portion 212. After the tumor layer 232 is removed, the surgeon may practice suturing the resulting defect or gap closed with sutures. The first and/or second layers 228, 230 may be made of suturable material. For example, a suturable material may include a thermoset polymer over molded onto fibers, mesh or fabric, a thermoplastic elastomer, or a thermoplastic elastomer over molded onto fibers, mesh or fabric. The fabric mesh material may also have bi-directional stretchable characteristics.

At least a portion of the tissue portion 212 is suspended by the frame 218 such that there is a space behind the simulated tissue portion 212 that allows manipulation of the simulated tumor 232 and/or tissue portion 212. The suspended portion is the middle portion of the tissue portion 212, the perimeter of which is attached to the frame 218. As a result, the attached tissue portion 212 has elasticity or springiness that simulates the elasticity of a rectum wall and that, in one variation, is different from the elasticity of the surrounding material.

Figure 20:
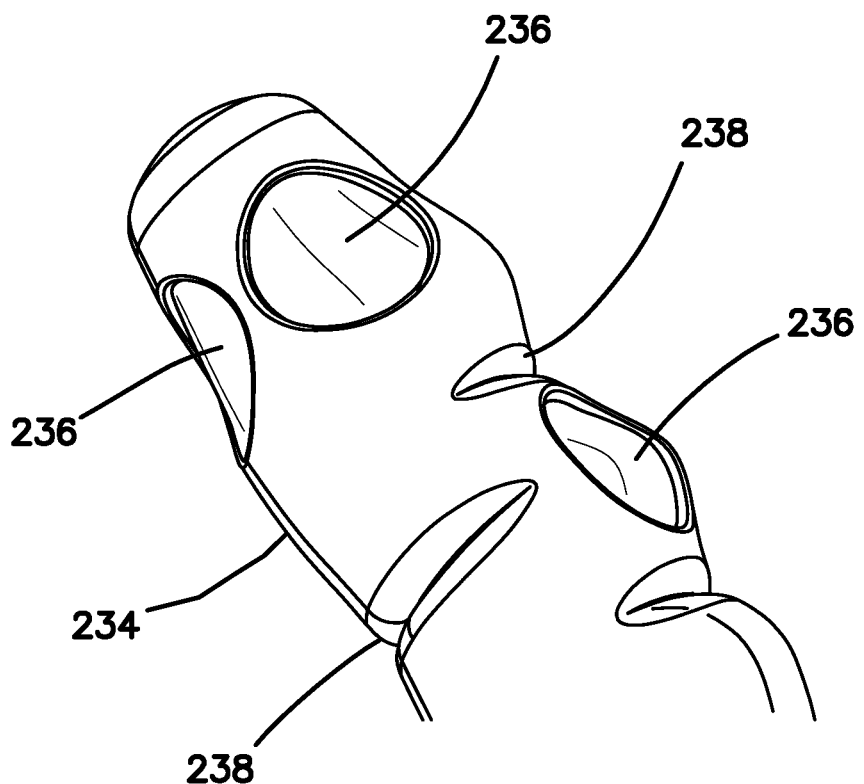
FIG. 20 is a top perspective view sectional of a mandrel used to manufacture a tissue simulation model according to the present invention.
Figure 21:
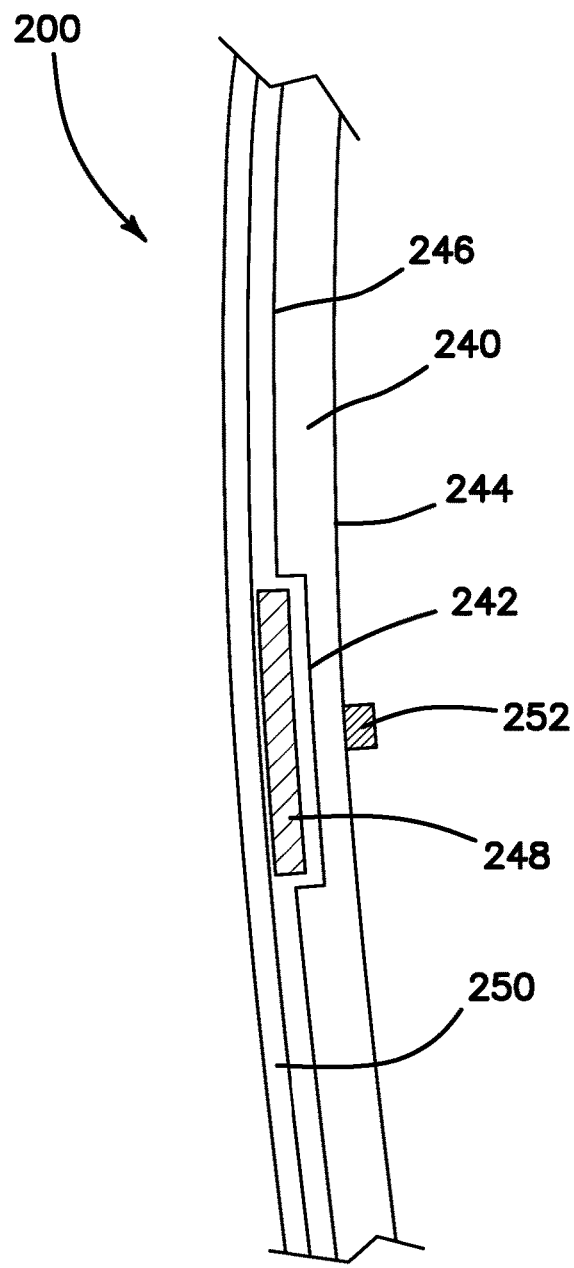
FIG. 21 is a sectional view of a tissue simulation model according to the present invention.

Turning now to FIG. 20, another variation of the tissue model will now be described. FIG. 20 illustrates a mandrel 234 for forming a simulated tissue model according to the present invention. The mandrel 234 is provided with at least one depression 236. The mandrel 234 may also include one or more crevices 238 that are substantially perpendicular to the longitudinal axis for forming transverse folds in the resulting tissue model. A section of a resulting tissue model is shown in FIG. 21. A first layer 240 of uncured silicone is evenly applied about the mandrel 234 of FIG. 20 and allowed to cure on the mandrel 234 to form a model 200 having a substantially cylindrical shape that mimics a bowel section or colon. The first layer 240 may include multiple applications of uncured silicone applied with swipes of a brush or other instrument carrying or pouring silicone. The silicone is allowed to cure resulting in the first layer 240 having an inner surface 244 and an outer surface 246 and at least one recess 242 formed in the outer surface 246 in the location of the at least one mandrel depression 236. A second layer 246, that is sized and shaped to fit inside the recess 242, is provided and placed inside the recess 242. The second layer 248 is substantially planar having an inner surface and an outer surface. The second layer 248 is placed in the recess 242 such that the inner surface faces the outer surface 246 of the first layer 240. The second layer 248 is made of yellow-dyed silicone which flexes to conform to the first layer 240. Adhesive may be used to bond the second layer 248 to the first layer 240. A third layer 250 is then applied onto the first layer 240 and the second layer 248 to capture the second layer 248 between the first layer 240 and the third layer 250. The third layer 250 is made of silicone that is clear or pink in color. The third layer 250 is typically evenly applied while the silicone is uncured to form a layer having a substantially uniform thickness. The third layer 250 naturally adheres to the first layer 240 as the silicone cures. A simulated tumor 252, lesion or tissue target is adhered to the inner surface 244 of the first layer 240 in the location adjacent inwardly from the second layer 248. In one variation, the second layer 248 is patch-like having a planar configuration with an outer surface and an inner surface and sized smaller than the first layer 240; and the tumor 252 is sized smaller than the second layer 248. The simulated tumor 252 protrudes into the interior from the inner surface 244 of the first layer 240. A plurality of simulated tumors 252 are placed adjoining the plurality of recesses 242 and second layers 248 throughout the tissue model 200. The simulated tumor 252 may also be formed as a layer having an inner surface and an outer surface with the outer surface being connected to the inner surface of the first layer 240. The first layer 240 provides a substantially smooth inner surface that faces the interior with the one or more simulated tumors 252 projecting inwardly. The outer surface of the third layer 250 is substantially smooth because the second layer 240 and its interface with the first layer 240 and third layer 250 are filled in with the wet silicone of the third layer 250. Thereby, a simulated tumor-containing bowel section is provided having an indicating layer provided by the second layer 248 being located behind the simulated tumor 252. In another variation, adhesive is applied between the first layer 240 and the second layer 248 in a location around the location of the simulated tumor 252 such that the central portion of the second layer 248 without adhesive is easily separable from the first layer 240. Additional adhesive may be applied between the second layer 248 and the third layer 250 to keep the second layer 248 in position when the first layer 240 and attached tumor 252 are removed. In yet another variation, no adhesive is applied between the first layer 240 and the second layer 248 such that the two adjacent layers can be easily separated. It is desirable to allow the first layer 240 to be separated from the second layer 248 in preselected areas that provide feedback to the surgeon as to the proper location of an incision. For example, if the trainee has made an incision far from the location of the tumor 252, the trainee will have a difficult time separating the glued areas between the first and second layers 240, 248; whereas, an incision made close to the tumor 252 will result in the surgeon encountering the un-glued area adjacent to the tumor 252 and will more easily separate the two layers 240, 248. In another variation, no adhesive is employed between the first layer 240 and the second layer 248 but because both of the layers are made of silicone and one cured on top of the other a natural adhesion without bonding with glue making the layers stick together yet easily separable. As the trainee surgically approaches the simulated tumor 252 from within the central lumen of the model via one of the proximal opening or the distal opening and begins to cut through the first layer 240, the second layer 248 provides as an indication or visual reference layer to stop cutting too deeply into or through the second layer 248. After removing the tumor 252 by cutting around the tumor 252 into first layer 240, the practitioner can see the change in color when the second layer 248 is visualized through the incision and approached, training the trainee to be precise in the dissection. The first layer 240 may include fibers, mesh or fabric configured to hold sutures so that the surgeon can practice placing sutures to close the gap created in the first layer 240. The reinforced first layer 240 helps retain the sutures so they do not tear through the silicone and may include stretchable mesh material.

Figure 22:
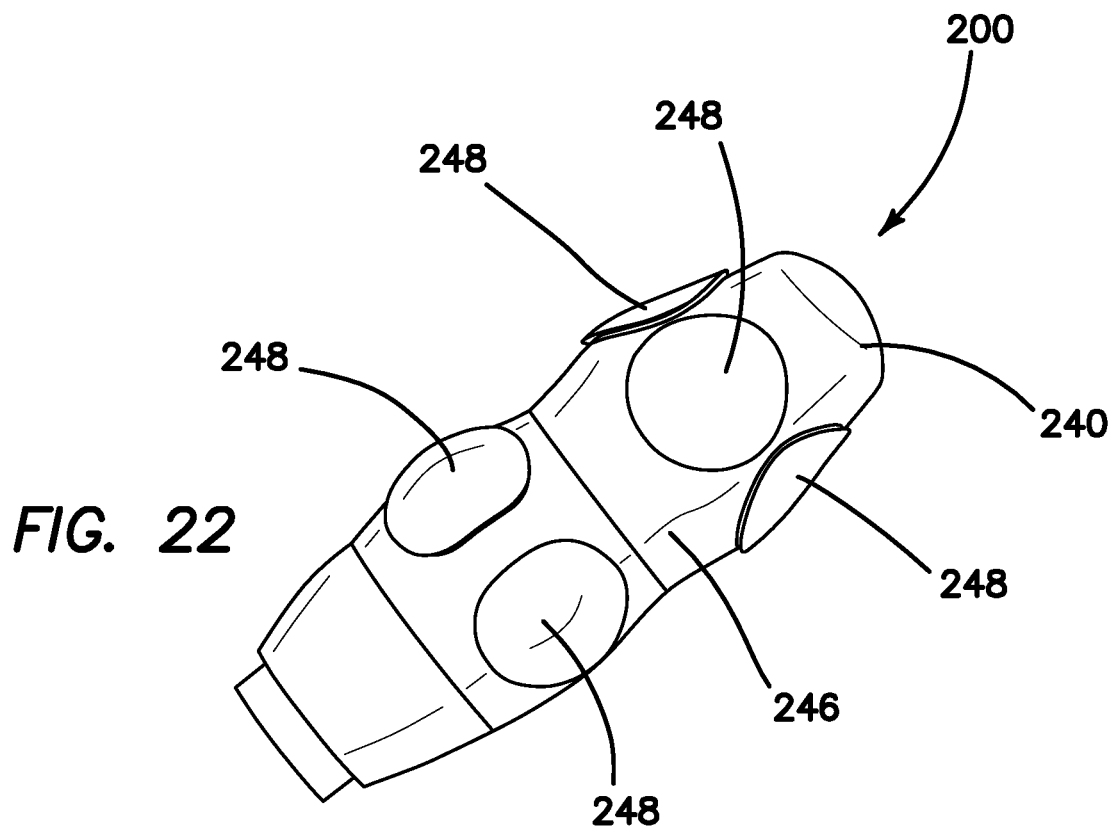
FIG. 22 is a top perspective view of a tissue simulation model according to the present invention.

In another variation of the simulated tissue model 200 illustrated in FIG. 22, uncured silicone is poured or brushed onto a mandrel and removed after it has been cured to form a first layer 240. The resulting first layer 240 molded about a cylindrical mandrel forms a substantially cylindrical shape having an open proximal end and/or open distal end and an inner surface 244 and an outer surface 246. The first layer 240 may include folds extending at least partially perpendicular and circumferentially to the longitudinal axis. The first layer 240 is dyed a pink color. One or more simulated tumor 252 (not shown in FIG. 22) is attached to the inner surface 244. The simulated tumor 252 is made of silicone having a dark color. A plurality of second layers 248 are attached to the outer surface of the first layer 240 in locations opposite to the simulated tumors 252. The second layer 248 is silicone dyed yellow in color and attached with adhesive. The second layer 248 is patch-like having a planar configuration with an outer surface and an inner surface sized smaller than the first layer 240. The tumor 252 is sized smaller than the second layer 248. The inner surface of the second layer 248 faces the outer surface 246 of the first layer 240. In this embodiment, the inner surface 244 of the first layer 240 is substantially smooth. In particular, the inner surface 244 of the first layer 240 in smooth in the area surrounding the simulated tumor 252. The simulated tumor 252 projects inwardly from the inner surface 244. The yellow second layer 248 is slightly visible through the first layer 240. The outer surface 246 of the first layer 240 is interrupted with outwardly protruding patches of the second layer 248. Hence, the model 200 does not look smooth from the outside as there is no overcoat smoothing layer applied; however, the model 200 appears smooth from the inside. The first layer 240 may include a mesh, fabric or fiber to facility suturing as described above. The yellow second layer 248 serves an indication layer to the trainee not to breach the simulated fat layer. After passing through the first layer 240, the trainee will visualize a greater color contrast or brighter color to the underlying second layer 248. The trainer can examine the model 200 subsequent to the simulation to examine if the second layer 248 has been breached in order to provide feedback to the trainee.

In any of the variations, the second layer 246 may be attached along its perimeter to the outer surface 246 of the first layer 240 such that the generally central area of the second layer 248 is easily separable form the outer surface 246 of the first layer 240 to assist the trainee in separating the first layer 240 and attached tumor 252 from the rest of the model 200 and, in particular, from the second layer 246. Alternatively, the second layer 248 may be selectively attached such that not the entirety of the inner surface of the second layer 248 adheres to the outer surface 246 of the first layer 240.

Figure 23:
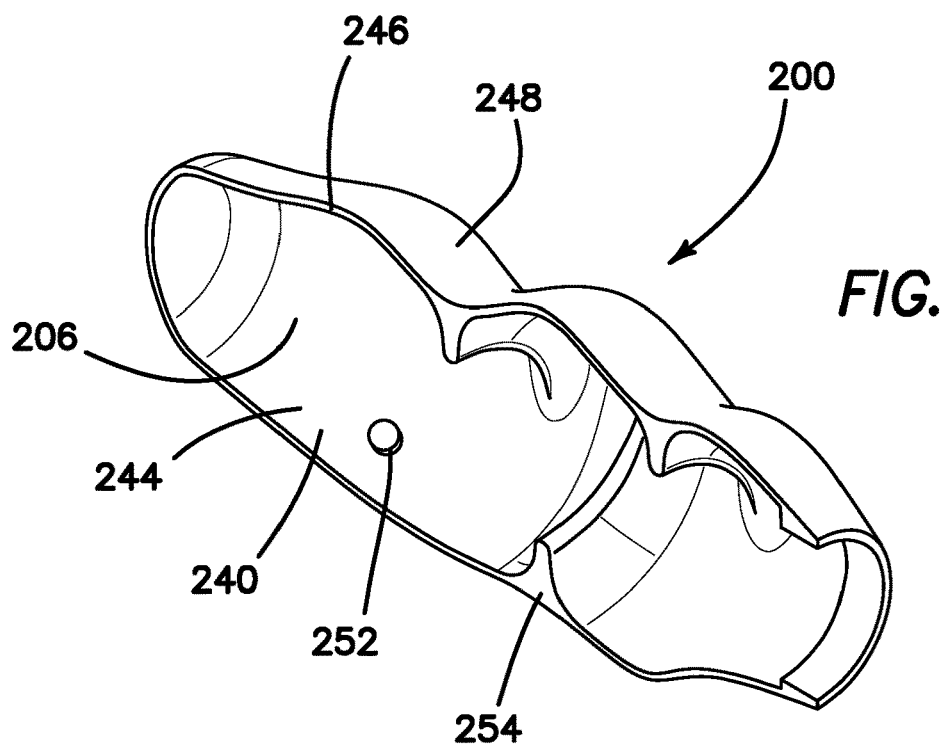
FIG. 23 is a sectional view of a tissue simulation model according to the present invention.

Turning now to FIG. 23, in another variation of the model 200, a first layer 240 of uncured silicone is applied to a cylindrical mandrel. The first layer 240 is colored pink and allowed to cure. A second layer 248 of silicone is then applied onto the outer surface 246 of the first layer 240 and allowed to cure such that the second layer 248 becomes attached to the first layer 240. The model 200 is then removed from the mandrel a tubular-like sleeve that is sized and shaped to resemble a colon or bowel section having optional transverse folds 254 extending inwardly into the central lumen 206. A simulated tumor 252 made of silicone is then attached to anywhere alone the inner surface 244 of the first layer 240. The first layer 240 is pink in color and simulates the rectal wall. In one variation, the first layer 240 includes a mesh, fabric or fiber to create a suturable wall configured to stretch under the forces applied by the user as well as to hold sutures without tearing through the silicone layer. The second layer 248 is yellow and simulates the mesorectum layer. The outer surface of the second layer 248 will be generally smooth along the length of the model 200 and the folds 254 project inwardly toward the longitudinal axis. The inner surface 244 is also generally smooth along the length of the model 200 and the folds 254 project into the central lumen 206. The smooth inner surface 244 is interrupted by the inwardly projecting simulated tumors 252 that are attached to the inner surface 244. The simulated tumors 252 have a color, such as black or dark red, that contrasts with the color of the first layer 240. The smooth inner and outer surfaces of the model 200 provide a realistic approach for the practitioner. Also, a user that approaches a lesion to be excised from the central lumen 206 will be able to make an incision into the first layer 240; hence, the first layer 240 is incisable. After the first layer 240 is penetrated, the user will visualize the yellow second layer 248 directly which will serve as a reference layer to indicate to the user that first layer 248 has been penetrated and that the incision should not proceed further into the second layer 248. Because the second layer 248 is not glued to the first layer 240 and allowed to cure onto the first layer 240, the first layer 240 along with the simulated tumor 252 is easily separated from the second layer 248. After the tumor 252 is removed, the user can practice suturing the resulting gap in the first layer 240 where the simulated tumor 252 was attached by passing sutures into the first layer 240 and closing the gap. The advantage of this variation of the model 200 permits the tumor 252 to be placed anywhere along the length of the model so that the user can practice removal of the tumor 252 located in hard to reach areas.

Figure 25:
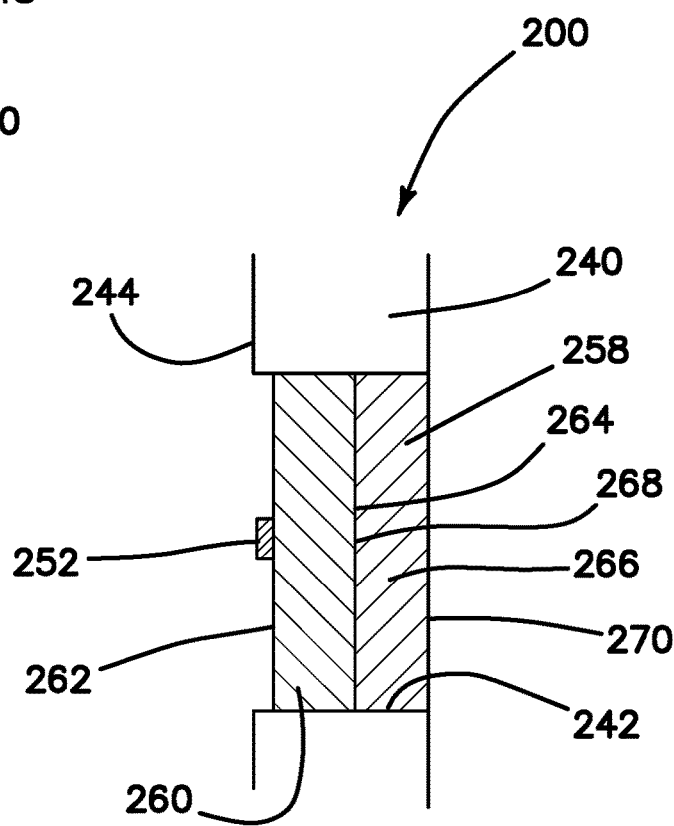
FIG. 25 is a sectional view of tissue simulation model according to the present invention.
Figure 24:
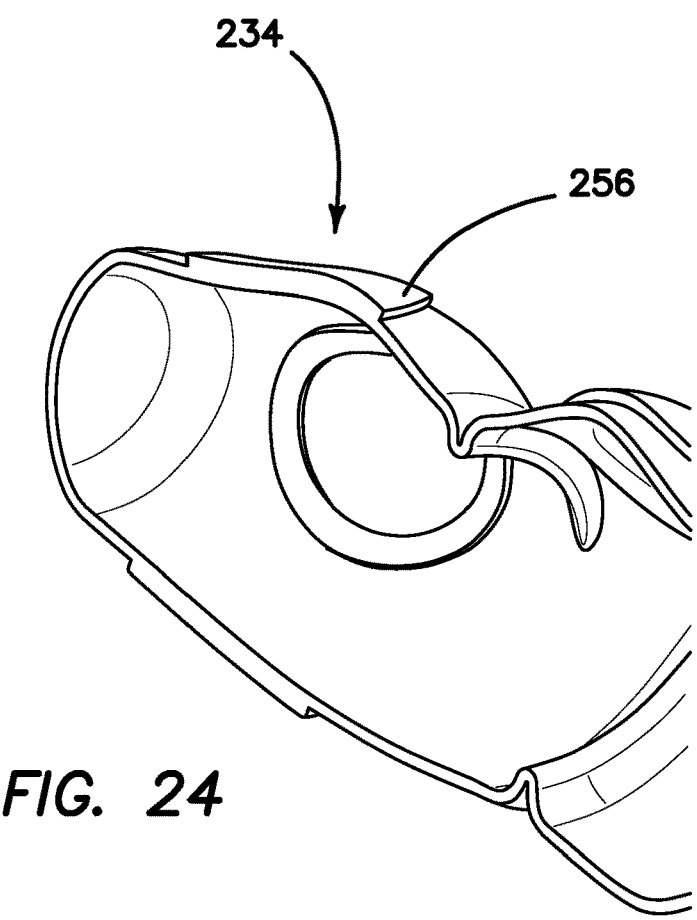
FIG. 24 is a sectional view of a mandrel for manufacturing a tissue simulation model according to the present invention.

Turning now to FIGS. 24 and 25, another variation of the model 200 will now be described. FIG. 24 illustrates a mandrel 234 having outward detents 256 that project outwardly from the outer surface of the mandrel 234. After a first layer 240 of silicone or other material is molded over the mandrel 234, the tubular-shaped model 200 is removed from the mandrel 234 leaving a model 200 having a plurality of recesses 242 formed in the first layer 240. The recesses 242 extend outwardly from the inner surface 244 to form wells for receiving simulated tumors 252 inside the recesses 242. A simulated tumor 252 may be formed as part of a pod. The polyp simulation 100 described above with respect to FIGS. 13A-16 may be placed in the recesses 242 and attached to the inner surface of the first layer 240 to the base of the well. In one variation shown in FIG. 25, the tumor pod 258 includes a first layer 260 having an inner surface 262 and an outer surface 264. The first layer 260 is substantially planar and corresponds is shape to the shape of the recess 242 in which it is inserted. The first layer 260 is made of silicone and is pink in color and matches the color of the first layer 240. A simulated tumor 252 is attached to the inner surface 262 of the first layer 260. The tumor 252 is also made of silicone and is darker in color than the first layer 260 to provide a color contrast indicative of a tumor. The tumor 252 extends outwardly from the inner surface 262 of the first layer 260 forming a protrusion. The tumor 252 has a smaller area than the first layer 260. The tumor pod 258 includes a second layer 266 having an inner surface 268 and an outer surface 270. The second layer 266 is made of silicone that is yellow in color to simulate the mesorectum. The second layer 266 is attached to the first layer 260 by being connected to each other while one of the layers 260, 266 is still uncured and allowing the uncured layer to cure onto the other layer. Thereby, the first layer 260 is more easily separated from the second layer 266 relative to being adhered with glue. In another variation, the first layer 260 is glued to the second layer 266 by calendaring the surface of one of the layers 260, 266 with adhesive and attaching the two layers together. The inner surface 268 of the second layer 266 faces the outer surface 264 of the first layer 260 when attached. In yet another variation, the adhesive is selectively applied around the location of the tumor 252 on the outer surface 264 of the first layer 260 or the inner surface 268 of the second layer 266 to create an area between the first layer 260 and the second layer 266 that is not adhered together making the area more easily separable from each other. The thickness of the first layer 260 and the second layer 266 combined is approximately the same thickness as the depth of the recess 242 in which it is placed making the inner surface 262 of the first layer 260 substantially flush or even with the inner surface of the first layer 240. In another variation, the thickness of the first layer 260 and second layer 266 combined is slightly less than the overall thickness of the first layer 240 such that the tumor 262 is slightly recessed. The user will visualize the tumor 252 and approach with instruments via the central lumen 246 from one or more opening at the ends of the model 200. The user will incise the first layer 260 of the tumor pod 258 at a location adjacent to the tumor 252 and guide a blade around the tumor 252 to excise it. The user will practice depth incision by visualizing when the yellow second layer 266 is reached being careful not to incise into the second layer 266. The first layer 260 and the attached tumor 252 is separated from the second layer 266 and removed from the model 200. The user can repeatedly practice such removal at other locations along the length of the model 200. The recesses 242 allow the modular pods 258 to be inserted while maintaining a substantially smooth outer surface and smooth inner surface of the model 200 while providing a reference layer for practicing depth perception with incision making. The second layer 266, serving as a reference layer, helps define a dissection pathway through the first layer 260 from the inner surface 262 of the first layer 260 to the outer surface 264 of the first layer 260 and then separation along the interface between the first layer 260 and the second layer 266. The first layer 260 and attached tumor 252 are pulled away from the second layer 266. The first layer 260 may also include a mesh material making the layer capable of holding sutures after the tumor 252 has been removed. The user can also practice closing the remnant gap with sutures. The suturable layers may include silicon with mesh material described above or, alternatively, be made of KRATON® such as VERSAFLEX® without a mesh, fabric or fiber reinforcement.

A fully suturable rectum model 300 is disclosed. The rectum model 300 is made of silicone with embedded mesh material. The rectum model 300 is fully suturable meaning the entire length of the tubular rectum model 300 contains mesh and can be suturable allowing surgeons and users to practice suturing techniques on a simulated colon. Silicone by itself does not lend itself to be easily and realistically suturable because the sutures do not hold and easily cut through the silicone material. The addition of mesh, such as SPANDEX, stops the suture from cutting through the silicone. As a result, silicone rectum models are too thick and, therefore, provide too much resistance for a suture passing through the full thickness. Practitioners are in need of practicing certain suturing techniques such as purse strings or simply suturing a defect closed. The present invention provides such a suturable rectum model.

Turning now to FIG. 26A, there is shown a mesh layer 302. The mesh layer 302 includes a first surface 304 opposite from a second surface 306. The mesh layer 302 is a substantially planar and thin layer comprising strands of fibers made of nylon or other polymer in the x-y plane. In one variation, the mesh layer 302 is made of LYCRA. In one variation, the mesh layer 302 is SPANDEX. In one variation, the mesh layer 302 is capable of being stretched in any direction. In another variation, the mesh layer has bi-directional stretch properties. The strands of polymer fiber form a web or net. The mesh layer 302 may be woven and have a uniform pattern. The mesh layer 302 is red, pink, clear or white in color.

Still referencing FIG. 26A and with further reference to FIG. 26B, the appropriate length and width of the mesh layer 302 is provided. As shown in FIG. 26B, the mesh layer 302 is formed into a cylinder and a longitudinal seam 308 is formed using a bar-sealer. The bar-seal heat-seals the mesh layer 302 together to form a seam 308. The cylindrical mesh layer 302 forms a sleeve 312 that has a central lumen 310 as shown in FIG. 27.

Figure 27:
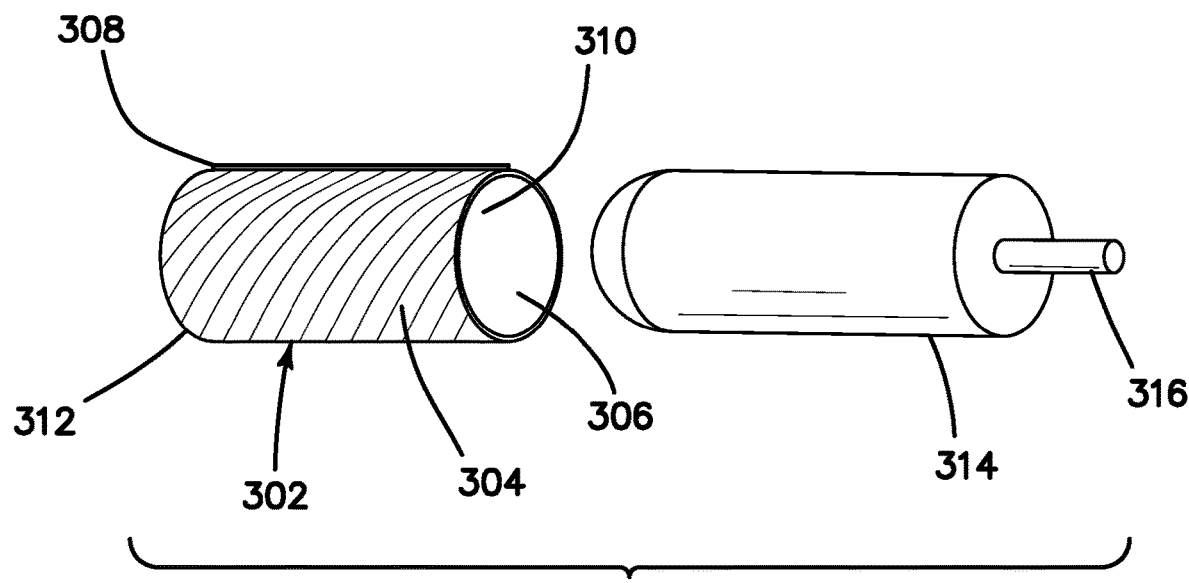
FIG. 27 illustrates a mesh sleeve being placed onto a mandrel according to the present invention.
Figure 28:
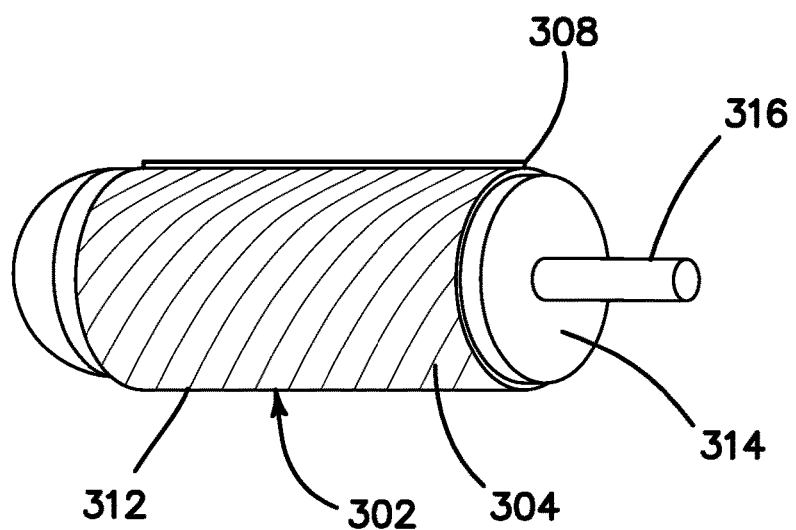
FIG. 28 illustrates a mesh sleeve located on a mandrel according to the present invention.

Turning now to FIGS. 27-28, a mandrel 314 is provided. A mold release agent is applied to the mandrel 314 such as by spraying the mandrel 314 or brushing it with the mold release. A mold release substitute or alternative may also be employed. After the mold release is applied to the mandrel 314, the mandrel 314 is inserted into the central lumen 310 of the sleeve 312. The sleeve 312 is sized and configured to fit over a mandrel 314 having a size and shape that mimics a real rectum. The inner diameter of the sleeve 312 has the same diameter or slightly larger diameter than the outer diameter of the mandrel 314. The mandrel 314 includes a rotating pin 316 which is connected to a motor that is configured to rotate the mandrel 314 about its longitudinal axis. While the mandrel 314 is rotating, uncured silicone is applied to sleeve 312 of mesh. Uncured silicone may be applied to the rotating mandrel 314 such as at the proximal and distal ends of the sleeve 312 or prior to inserting the mandrel 314 into the sleeve 312. The uncured silicone is evenly applied with a brush or other dispensing mechanism. Uncured silicone is repeatedly applied and over previous applications of silicone on the sleeve 312. In one variation, uncured silicone is applied before the mandrel 314 is inserted into the sleeve 312.

After the application of silicone is completed and the mesh is completely covered or until the desired thickness of the product is achieved, the silicone is allowed to fully cure. Then, the cured silicone and mesh product are removed from the mandrel 314. The result is a mesh layer 302 embedded in the silicone forming a tubular rectum model 300 that is suturable along its entirety. Embedding the sleeve 312 of mesh into the silicone inhibits cutting and tearing of the silicone during the practicing of suturing the rectum model 300. As a result, of the rectum model 300 being fully suturable complex suturing techniques such as the coin purse or purse string placement of sutures shown in FIG. 29. In FIG. 29, the fully suturable rectum model 300 is viewed along its longitudinal axis 318. A suture 320 is passed in and out of the rectum model 300 in a daisy-like pattern without the rectum model wall being torn as a result of the embedded mesh construction. The ends of the suture 320 may then be cinched like a coin purse to constrict the central lumen of the rectum model 300.

In one variation, instead of a cylindrical sleeve 312 of mesh material, one or more strips of mesh material are placed directly onto the mandrel and held in place or placed onto uncured silicone brushed onto the mandrel 314 followed by consecutive applications of uncured silicone in an even fashion around the mandrel 314 to embed the one or more strips of mesh material.

U.S. patent application Ser. No. 13/656,467 entitled "Simulated tissue structure for surgical training" filed on Oct. 19, 2012, which claims priority to and benefit of U.S. Provisional Patent Application Ser. No. 61/549,838 entitled "Simulated tissue structure for surgical training" filed on Oct. 21, 2011, is incorporated herein by reference in its entirety.

It is understood that various modifications may be made to the embodiments of the system disclosed herein. Therefore, the above description should not be construed as limiting, but merely as exemplifications of preferred embodiments. Those skilled in the art will envision other modifications within the scope and spirit of the present disclosure.

We claim:

1. A simulated tissue model, comprising:
a substantially cylindrical tube having an inner surface and an outer surface extending between a proximal end and a distal end and defining a central lumen having a longitudinal axis, wherein the cylindrical tube comprises:
a first layer made of silicone having a first tubular sidewall with an inner surface and an outer surface and at least one recess having a depth formed in the outer surface of the first tubular sidewall;
a second layer made of silicone having a substantially planar inner surface opposite a substantially planar outer surface defining a thickness therebetween; the second layer being sized and configured to fit inside the recess;
a third layer made of silicone having a second tubular sidewall with an inner surface and an outer surface; the second tubular sidewall being substantially uniform; the third layer and the first layer are adhered together such that the inner surface of the second tubular sidewall faces and contacts the outer surface of the first tubular sidewall and such that the second layer inside the recess is captured between the first layer and third layer.

2. The simulated tissue model of claim 1 wherein the inner surface and outer surface of the cylindrical tube correspond respectively to the inner surface of the first tubular sidewall and the outer surface of the second tubular sidewall.

3. The simulated tissue model of claim 1 wherein the second layer is placed inside the recess such that the substantially planar inner surface of the second layer faces the outer surface of the first layer.

4. The simulated tissue model of claim 1 further comprising a simulated tumor adhered to the inner surface of the first tubular sidewall in a location adjacent inwardly from the second layer.

5. The simulated tissue model of claim 4 wherein the simulated tumor protrudes into an interior of the cylindrical tube from the inner surface of the first layer.

6. The simulated tissue model of claim 4 wherein the first layer and second layer are selectively adhered in at least one or more regions of the recess.

7. The simulated tissue model of claim 6 wherein the at least one or more regions of the recess correspond to an area that is around the location of the simulated tumor on the inner surface of the first layer.

8. The simulated tissue model of claim 6 wherein the first layer and second layer are separable within a region of the recess that is located adjacent outwardly from the location of the simulated tumor on the inner surface of the first layer.

9. The simulated tissue model of claim 4 wherein the second layer is smaller in size than the first layer and the simulated tumor is smaller in size than the second layer.

10. The simulated tissue model of claim 4 wherein the second layer is configured to provide visual feedback to facilitate excision of the simulated tumor.

11. The simulated tissue model of claim 10 wherein the second layer is yellow in color while the third layer being clear or pink in color.

12. The simulated tissue model of claim 1 further comprising a mesh layer embedded in the first layer.

13. The simulated tissue model of claim 1 wherein the substantially cylindrical tube further comprising one or more transverse folds extending inwardly into the central lumen.

14. The simulated tissue model of claim 1 wherein the cylindrical tube represents a bowel section or colon having a plurality of simulated tumor adjoining a plurality of recesses and a plurality of second layers throughout the cylindrical tube.

15. A method for manufacturing a simulated tissue model, comprising the steps of:

providing an elongated mandrel having an outer surface with at least one depression;
rotating the mandrel;
applying a first layer of uncured silicone on the mandrel;
allowing the first layer to cure to form a substantially tubular structure having an inner surface and an outer surface and a well having a depth formed in the outer surface in the location of the depression;
providing a second layer of cured silicone having a shape substantially corresponding to the shape of the well and a thickness substantially corresponding to the depth of the well;
placing the second layer inside the well of the first layer;
applying a third layer of uncured silicone on the outer surface of the first layer and second layer; and
allowing the third layer to cure and adhere to the first layer and second layer to form a smooth outer surface.

16. The method of claim 15 further comprising the steps of:
providing a simulated tumor having a size smaller than the second layer; and
attaching the simulated tumor to the inner surface of the first layer in the location of the depression adjacent to the second layer.

17. The method of claim 16 further comprising the step of adhering the second layer to the outer surface of the first layer such that the second layer is adhered around the location of the tumor and not adhered in the location of the tumor.

18. The method of claim 15 further including the step of embedding a layer of mesh within the first layer.

19. The method of claim 15 wherein the step of providing an elongated mandrel comprises providing an elongated mandrel having an outer surface with at least one depression and at least one crevice.

20. The method of claim 19 wherein the at least one crevice is substantially perpendicular to a longitudinal axis of the elongated mandrel for forming transverse folds in the resulting simulated tissue model.

* * * * *